(12) United States Patent
Bar-Zeev et al.

(10) Patent No.: US 11,712,628 B2
(45) Date of Patent: Aug. 1, 2023

(54) METHOD AND DEVICE FOR ATTENUATION OF CO-USER INTERACTIONS

(71) Applicant: Apple Inc., Cupertino, CA (US)

(72) Inventors: Avi Bar-Zeev, Oakland, CA (US); Alexis Henri Palangie, Palo Alto, CA (US); Luis Rafael Deliz Centeno, Fremont, CA (US); Rahul Nair, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/271,551

(22) PCT Filed: Sep. 17, 2019

(86) PCT No.: PCT/US2019/051568
§ 371 (c)(1),
(2) Date: Feb. 25, 2021

(87) PCT Pub. No.: WO2020/061087
PCT Pub. Date: Mar. 26, 2020

(65) Prior Publication Data
US 2021/0339143 A1 Nov. 4, 2021

Related U.S. Application Data

(60) Provisional application No. 62/733,805, filed on Sep. 20, 2018.

(51) Int. Cl.
*A63F 13/75* (2014.01)
*A63F 13/79* (2014.01)
*A63F 13/87* (2014.01)
*G06F 3/01* (2006.01)

(52) U.S. Cl.
CPC ............. *A63F 13/75* (2014.09); *A63F 13/79* (2014.09); *A63F 13/87* (2014.09); *G06F 3/017* (2013.01); *A63F 2300/8082* (2013.01)

(58) Field of Classification Search
CPC .......... A63F 13/75; A63F 13/79; A63F 13/87; A63F 2300/8082; G06F 3/011; G06F 3/017
USPC ........................................................ 463/42
See application file for complete search history.

(56) References Cited

U.S. PATENT DOCUMENTS

| | | | | |
|---|---|---|---|---|
| 7,961,174 B1 * | 6/2011 | Markovic | ............. | A63F 13/428 345/158 |
| 8,332,955 B2 * | 12/2012 | Kawanaka | .......... | H04L 63/1483 715/757 |
| 9,056,248 B2 * | 6/2015 | Alewine | ............ | G06Q 30/0641 |
| 9,093,259 B1 * | 7/2015 | Quinn | .................. | G06F 3/04815 |

(Continued)

OTHER PUBLICATIONS

International Search Report and Written Opinion dated Jan. 14, 2020, International Application No. PCT/US2019/051568, pp. 1-17.

*Primary Examiner* — Michael A Cuff
(74) *Attorney, Agent, or Firm* — Fernando & Partners, LLP

(57) ABSTRACT

In various implementations, methods and devices for attenuation of co-user interactions in SR space are described. In one implementation, a method of attenuating avatars based on a breach of avatar social interaction criteria is performed at a device provided to deliver simulated reality (SR) content. In one implementation, a method of close collaboration in SR setting is performed at a device provided to deliver SR content.

22 Claims, 21 Drawing Sheets

(56) References Cited

U.S. PATENT DOCUMENTS

| | | | |
|---|---|---|---|
| 2008/0221892 A1* | 9/2008 | Nathan | G06F 40/35 704/9 |
| 2009/0177979 A1* | 7/2009 | Garbow | G06F 3/00 715/757 |
| 2010/0081508 A1 | 4/2010 | Bhogal et al. | |
| 2010/0146085 A1* | 6/2010 | Van Wie | H04L 65/605 709/224 |
| 2011/0298827 A1 | 12/2011 | Perez | |
| 2012/0290950 A1* | 11/2012 | Rapaport | G06Q 10/10 715/753 |
| 2013/0305169 A1* | 11/2013 | Gold | G06Q 10/10 715/757 |
| 2014/0282586 A1* | 9/2014 | Shear | G06F 16/245 718/104 |
| 2016/0027209 A1* | 1/2016 | Demirli | G06T 19/006 345/419 |
| 2016/0034305 A1* | 2/2016 | Shear | G06F 9/50 707/722 |
| 2017/0039045 A1* | 2/2017 | Abrahami | A61B 5/0205 |
| 2017/0123752 A1* | 5/2017 | Nadler | G06T 13/205 |
| 2017/0205892 A1* | 7/2017 | Petrovskaya | G06T 17/20 |
| 2017/0326457 A1 | 11/2017 | Tilton et al. | |
| 2019/0020530 A1* | 1/2019 | Au | H04W 72/0413 |
| 2019/0313200 A1* | 10/2019 | Stein | G06F 3/012 |
| 2020/0177870 A1* | 6/2020 | Tadi | G06F 3/014 |
| 2021/0397260 A1* | 12/2021 | Birnbaum | H04N 13/172 |

\* cited by examiner

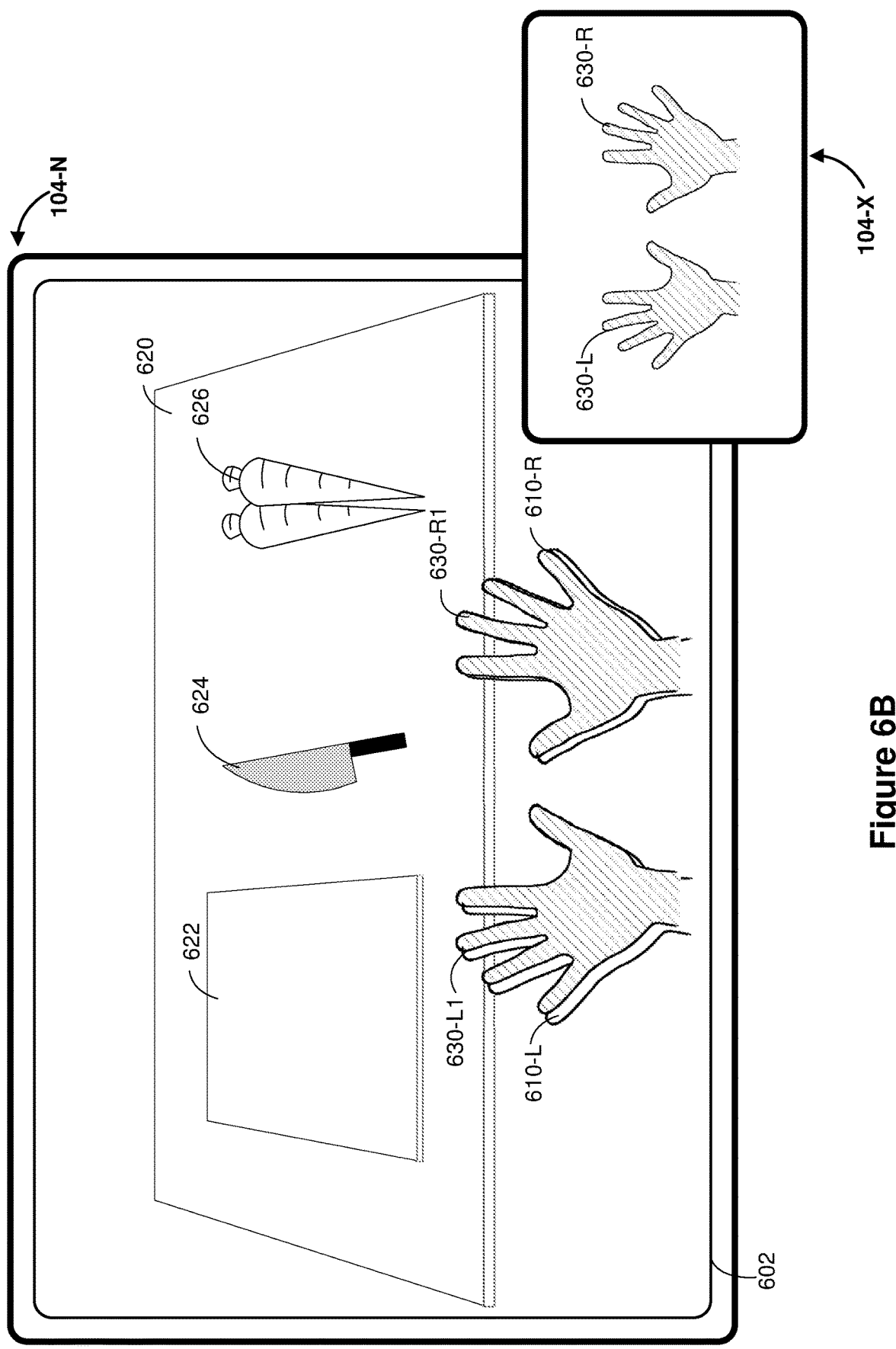

METHOD AND DEVICE FOR ATTENUATION OF CO-USER INTERACTIONS

CROSS-REFERENCES TO RELATED APPLICATIONS

This application is the national phase entry of Intl. Patent App. No. PCT/US2019/051568, filed on Sep. 17, 2019, which claims priority to U.S. Provisional Patent App. No. 62/733,805, which are both hereby incorporated by reference in their entireties.

TECHNICAL FIELD

The present disclosure generally relates to attenuating co-user interactions in a simulated reality setting.

BACKGROUND

A physical setting refers to a world that individuals can sense and/or with which individuals can interact without assistance of electronic systems. Physical settings (e.g., a physical forest) include physical elements (e.g., physical trees, physical structures, and physical animals). Individuals can directly interact with and/or sense the physical setting, such as through touch, sight, smell, hearing, and taste.

In contrast, a simulated reality (SR) setting refers to an entirely or partly computer-created setting that individuals can sense and/or with which individuals can interact via an electronic system. In SR, a subset of an individual's movements is monitored, and, responsive thereto, one or more attributes of one or more virtual objects in the SR setting is changed in a manner that conforms with one or more physical laws. For example, a SR system may detect an individual walking a few paces forward and, responsive thereto, adjust graphics and audio presented to the individual in a manner similar to how such scenery and sounds would change in a physical setting. Modifications to attribute(s) of virtual object(s) in a SR setting also may be made responsive to representations of movement (e.g., audio instructions).

An individual may interact with and/or sense a SR object using any one of his senses, including touch, smell, sight, taste, and sound. For example, an individual may interact with and/or sense aural objects that create a multi-dimensional (e.g., three dimensional) or spatial aural setting, and/or enable aural transparency. Multi-dimensional or spatial aural settings provide an individual with a perception of discrete aural sources in multi-dimensional space. Aural transparency selectively incorporates sounds from the physical setting, either with or without computer-created audio. In some SR settings, an individual may interact with and/or sense only aural objects.

One example of SR is virtual reality (VR). A VR setting refers to a simulated setting that is designed only to include computer-created sensory inputs for at least one of the senses. A VR setting includes multiple virtual objects with which an individual may interact and/or sense. An individual may interact and/or sense virtual objects in the VR setting through a simulation of a subset of the individual's actions within the computer-created setting, and/or through a simulation of the individual or his presence within the computer-created setting.

Another example of SR is mixed reality (MR). A MR setting refers to a simulated setting that is designed to integrate computer-created sensory inputs (e.g., virtual objects) with sensory inputs from the physical setting, or a representation thereof. On a reality spectrum, a mixed reality setting is between, and does not include, a VR setting at one end and an entirely physical setting at the other end.

In some MR settings, computer-created sensory inputs may adapt to changes in sensory inputs from the physical setting. Also, some electronic systems for presenting MR settings may monitor orientation and/or location with respect to the physical setting to enable interaction between virtual objects and real objects (which are physical elements from the physical setting or representations thereof). For example, a system may monitor movements so that a virtual plant appears stationery with respect to a physical building.

One example of mixed reality is augmented reality (AR). An AR setting refers to a simulated setting in which at least one virtual object is superimposed over a physical setting, or a representation thereof. For example, an electronic system may have an opaque display and at least one imaging sensor for capturing images or video of the physical setting, which are representations of the physical setting. The system combines the images or video with virtual objects, and displays the combination on the opaque display. An individual, using the system, views the physical setting indirectly via the images or video of the physical setting, and observes the virtual objects superimposed over the physical setting. When a system uses image sensor(s) to capture images of the physical setting, and presents the AR setting on the opaque display using those images, the displayed images are called a video pass-through. Alternatively, an electronic system for displaying an AR setting may have a transparent or semi-transparent display through which an individual may view the physical setting directly. The system may display virtual objects on the transparent or semi-transparent display, so that an individual, using the system, observes the virtual objects superimposed over the physical setting. In another example, a system may comprise a projection system that projects virtual objects into the physical setting. The virtual objects may be projected, for example, on a physical surface or as a holograph, so that an individual, using the system, observes the virtual objects superimposed over the physical setting.

An augmented reality setting also may refer to a simulated setting in which a representation of a physical setting is altered by computer-created sensory information. For example, a portion of a representation of a physical setting may be graphically altered (e.g., enlarged), such that the altered portion may still be representative of but not a faithfully-reproduced version of the originally captured image(s). As another example, in providing video pass-through, a system may alter at least one of the sensor images to impose a particular viewpoint different than the viewpoint captured by the image sensor(s). As an additional example, a representation of a physical setting may be altered by graphically obscuring or excluding portions thereof.

Another example of mixed reality is augmented virtuality (AV). An AV setting refers to a simulated setting in which a computer-created or virtual setting incorporates at least one sensory input from the physical setting. The sensory input(s) from the physical setting may be representations of at least one characteristic of the physical setting. For example, a virtual object may assume a color of a physical element captured by imaging sensor(s). In another example, a virtual object may exhibit characteristics consistent with actual weather conditions in the physical setting, as identified via imaging, weather-related sensors, and/or online weather data. In yet another example, an augmented reality forest may have virtual trees and structures, but the animals may have features that are accurately reproduced from images taken of physical animals.

Many electronic systems enable an individual to interact with and/or sense various SR settings. One example includes head mounted systems. A head mounted system may have an opaque display and speaker(s). Alternatively, a head mounted system may be designed to receive an external display (e.g., a smartphone). The head mounted system may have imaging sensor(s) and/or microphones for taking images/video and/or capturing audio of the physical setting, respectively. A head mounted system also may have a transparent or semi-transparent display. The transparent or semi-transparent display may incorporate a substrate through which light representative of images is directed to an individual's eyes. The display may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one embodiment, the transparent or semi-transparent display may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical setting (e.g., onto a physical surface or as a holograph). Other examples of SR systems include heads up displays, automotive windshields with the ability to display graphics, windows with the ability to display graphics, lenses with the ability to display graphics, headphones or earphones, speaker arrangements, input mechanisms (e.g., controllers having or not having haptic feedback), tablets, smartphones, and desktop or laptop computers.

SR technology allows for social interactions among users even when the users are not physically near one another. However, there is no restriction that prevents two virtual avatars from attempting to occupy the same virtual space.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 6A-6D illustrate exemplary user interfaces of close collaboration in SR setting in accordance with some implementations.

Figure 1:
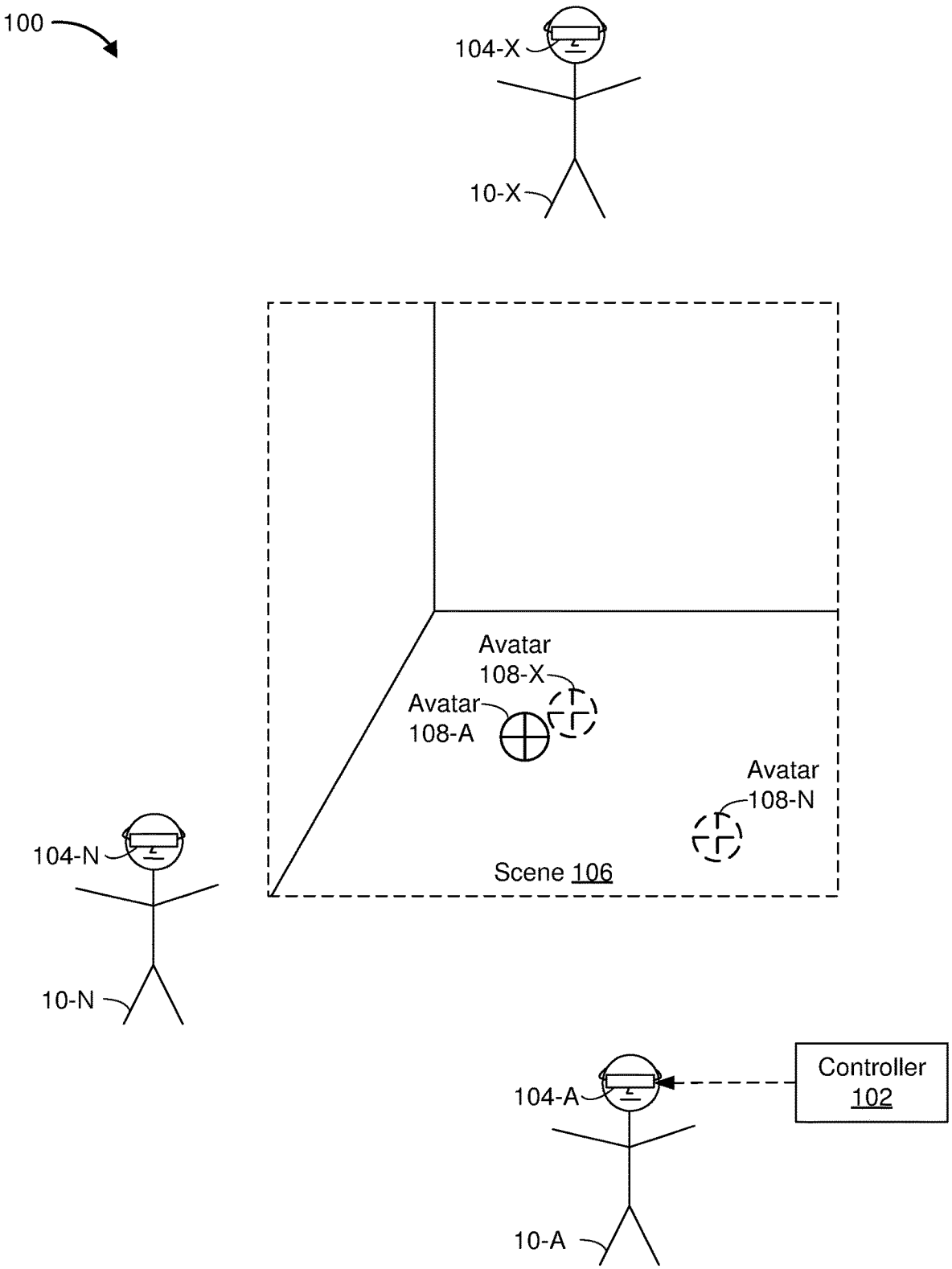
FIG. 1 illustrates an exemplary SR setting shared by multiple users in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for attenuating avatars in simulated reality (SR) setting based on a breach of one or more avatar social interaction criteria. In various implementations, the method is performed at a device provided to deliver SR content, the device including one or more processors, non-transitory memory, one or more displays, and one or more audio speakers. The method includes displaying SR content to a first user using the one or more displays, the SR content including an avatar associated with a second user. The method further includes determining whether behavior of the avatar associated with the second user breaches one or more avatar social interaction criteria. The method additionally includes attenuating at least a portion of the avatar associated with the second user according to a determination that the one or more avatar social interaction criteria are breached.

Various implementations disclosed herein include devices, systems, and methods for close collaboration in SR setting. In various implementations, the method is performed at a device provided to deliver SR content, the device including one or more processors, non-transitory memory, one or more displays, and one or more audio speakers. The method includes determining a sightline perspective of a first user of the device relative to an object. The method further includes obtaining a sightline perspective of a second user and a body pose of the second user relative to the object. The method additionally includes rendering for display of the body pose of the second user into the sightline perspective of the first user.

In various implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates exemplary operating setting 100, which is a shared setting provided (e.g., available) to multiple users, e.g., user 10-A, 10-N, and 10-X, through multiple SR devices 104, e.g., SR devices 104-A, 104-N, and 104-X. In some implementations, each of the SR devices 104 is associated with a controller 102. In the example of FIG. 1, each of the SR devices 104 is worn by a user 10, e.g., the SR device 104-A is worn by the user 10-A, the SR device 104-N is worn by the user 10-N, and the SR device 104-X is worn by the user 10-X etc.

In some implementations, each SR device 104 corresponds to a head-mountable device (HMD), tablet, mobile phone, wearable computing device, or the like. In some implementations, each SR device 104 is configured to present an SR experience to the user 10. In some implementations, each SR device 104 includes a suitable combination of software, firmware, and/or hardware.

According to some implementations, each SR device 104 presents an SR experience to the user 10 while the user 10 is virtually and/or physically present within a scene 106. In some implementations, a respective avatar 108 represents the user 10 in the scene 106, e.g., the avatar 108-A represents the user 10-A, the avatar 108-N represents the user 10-N, and the avatar 108-X represents the user 10-X in the scene 106. As will be described below, in order to improve user's experience, some interactions between avatars 108 are attenuated. Further as will be described below, there are various degrees of attenuation. For instance, initially, the avatars 108 are fully visible. When one or more avatar social interaction criteria are breached, the avatars 108 and/or content in connection with behaviors of the avatars 108 can become partially invisible, fully invisible, or anywhere in between along a spectrum of attenuation.

In some implementations, while presenting an SR experience, the SR device 104 is configured to present SR content and to enable video pass-through of the scene 106 (e.g., the SR device 104 corresponds to an SR-enabled mobile phone or tablet). In some implementations, while presenting the SR experience, the SR device 104 is configured to present the AR content and to enable optical see-through of the scene 106 (e.g., the SR device 104 corresponds to an SR-enabled glasses). In some implementations, while presenting a SR experience, the SR device 104 is configured to present the SR content and to optionally enable video pass-through of the scene 106 (e.g., the SR device 104 corresponds to a SR-enabled HMD).

In some implementations, the user 10 wears the SR device 104 on his/her head (e.g., as shown in FIG. 1). As such, the SR device 104 includes one or more SR displays provided to display the SR content. For example, the SR device 104 encloses the field-of-view of the user 10. In some implementations, the SR device 104 is replaced with an SR chamber, enclosure, or room configured to present SR content in which the user 10 does not wear the SR device 104. In some implementations, the user 10 holds the SR device 104 in his/her hand(s).

In some implementations, the controller 102 is configured to manage and coordinate an SR experience for the user 10. In some implementations, the controller 102 includes a suitable combination of software, firmware, and/or hardware. In some implementations, the controller 102 is a computing device that is local or remote relative to the scene 106. For example, the controller 102 is a local server located within the scene 106. In another example, the controller 102 is a remote server located outside of the scene 106 (e.g., a cloud server, central server, etc.). In some implementations, the controller 102 is communicatively coupled with the SR device 104 via one or more wired or wireless communication channels (e.g., BLUETOOTH, IEEE 802.11x, IEEE 802.16x, IEEE 802.3x, etc.). In some implementations, through the one or more wired or wireless communication channels, the SR devices 104 communicate with each other. In some implementations, the functionalities of the controller 102 are provided by and/or combined with the SR device 104 in order to update the scene and share the virtual space.

As illustrated in FIG. 1, the SR device 104 presents the scene 106, which in some implementations is generated by the controller 102 and/or the SR device 104. In some implementations, the scene 106 includes a virtual scene that is a simulated replacement of a real-world scene. In other words, in some implementations, the scene 106 is simulated by the controller 102 and/or the SR device 104. In such implementations, the scene 106 is different from the real-world scene where the SR device 104 is located. In some implementations, the scene 106 includes an augmented scene that is a modified version of a real-world scene. For example, in some implementations, the controller 102 and/or the SR device 104 modify (e.g., augment) the real-world scene where the SR device 104 is located in order to generate the scene 106. In some implementations, the controller 102 and/or the SR device 104 generate the scene 106 by removing and/or adding items from the simulated replica of the real-world scene where the SR device 104 is located.

Figure 2:
FIG. 2A illustrates a spectrum of attenuation in accordance with some implementations.
FIG. 2B illustrates an exemplary trust metric for determining the spectrum of attenuation in accordance with some implementations.

FIGS. 2A-2B illustrate a spectrum of attenuation 200 and an exemplary trust metric 250 for determining the spectrum of attenuation 200 in accordance with some implementations. In some implementations, an avatar in the SR setting can be invisible, partially attenuated, fully visible, or anywhere in between along the spectrum of attenuation 200. For example, initially the avatar is fully visible, meaning that objects situated in the scene behind the avatar are not visible. But, when needed the avatar can become partially invisible or invisible in order to discourage uncooperative behaviors in the shared SR setting. Consider, for example, a first avatar and a second avatar representing two users who are sharing an SR setting. If the second user controls the second avatar in such a way that the second avatar repeatedly runs into the first avatar, the devices generating the SR setting can cause the first avatar to fade out so as to discourage the second user from further encroaching on the space of the first avatar. Other levels of attenuation along spectrum 200 are possible.

In another example, when behaviors of a first avatar breaches one or more avatar social interaction criteria, the uncooperative first avatar is attenuated, e.g., fading the SR content associated with the uncooperative first avatar, effectively removing the first avatar from further participation in the SR setting, thereby encouraging the user (represented by the first avatar) to participate in a way that is less distracting for others in the SR experience.

As used herein, avatar social interaction criteria include threshold distances, threshold volume, and behavior patterns associated with an avatar representing a user. When behaviors of other avatars match or breach the threshold distances, threshold volume, and/or behavior patterns such actions behaviors trigger actions in the virtual space intended to facilitate cooperation between users. As an example of a behavior pattern, if a first avatar repeatedly attempts to walk through a second avatar within, the SR setting may attenuate the visibility of the second avatar to the first avatar (such that the first avatar can no longer find the second avatar to walk through), and the SR setting may attenuate the visibility of the first avatar to all others in the SR setting (such that the first avatar is not incentivized to capitalize on publicity).

Figure 3:
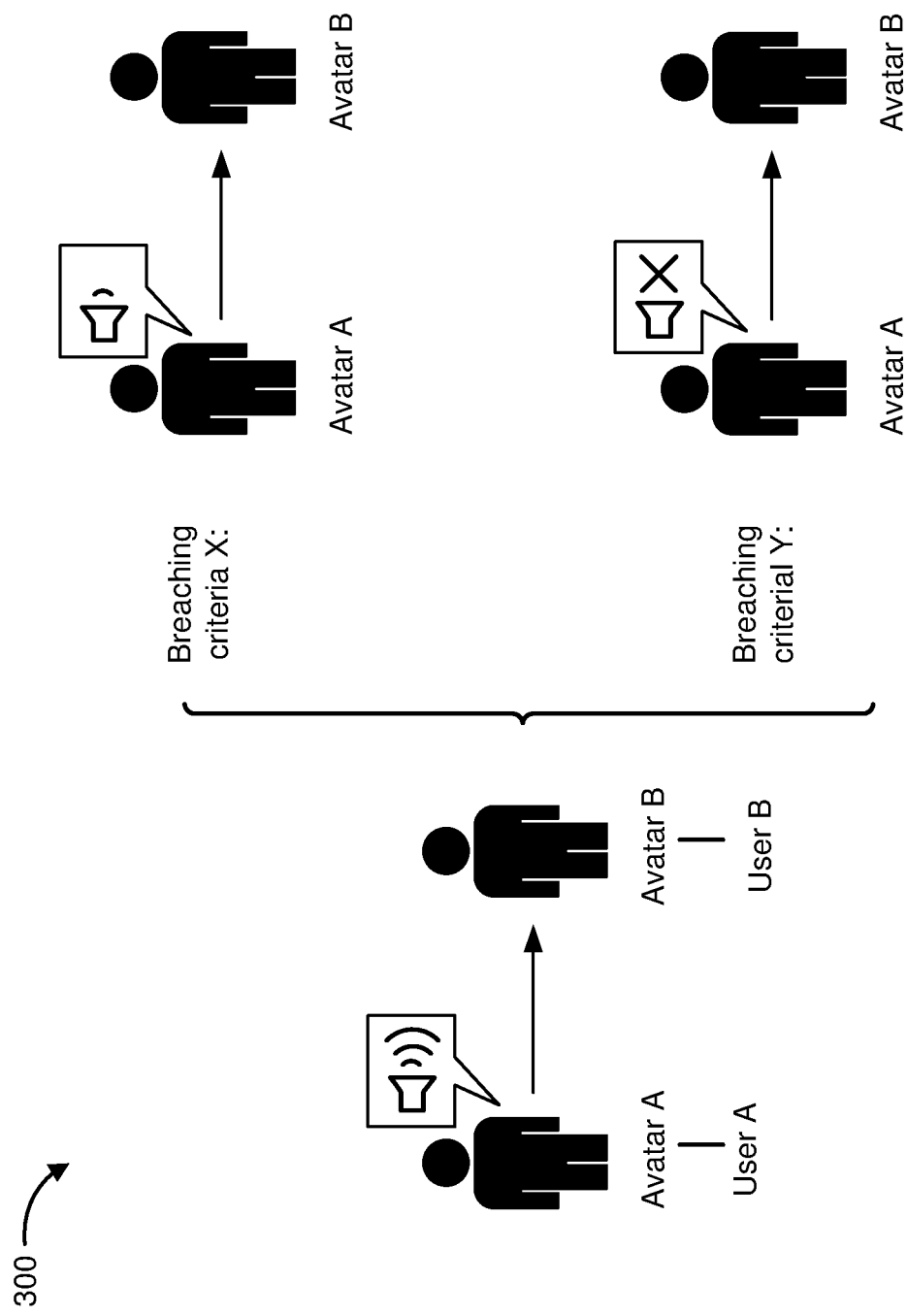
FIG. 3 illustrates audio content attenuation in accordance with some implementations.

In some implementations, the various degrees of attenuation along the spectrum of attenuation 200 include not only visual adjustment but also audio content adjustment. For example, as shown in FIG. 3, a block diagram 300 illustrating audio content attenuation, when avatar A representing user A yells at avatar B representing user B, the loud audio volume exceeds a first threshold volume, as represented by avatar social interaction criteria X. The breaching causes attenuation of the audio volume, such that the audio volume played through the SR device speaker (e.g., reducing playback audio) worn by user B is reduced. When the volume further exceeds a second threshold volume, as represented by the avatar social interaction criteria Y in FIG. 3, the breaching causes volume reduction, e.g., as if the loud speech did not happen from user B's perspective.

It is noted that entities implementing the techniques described herein should take care to not overly suppress freedoms of expression in SR setting. For example, SR systems implementing the techniques described herein may permit users to opt-in and/or opt-out of the described techniques. Indeed, in some SR setting, criteria for social interactions may be adjusted. Referring back to FIG. 2B, in some implementations, the avatar social interaction criteria are determined based at least partially on the trust metric 250. As shown in FIG. 2B, in some implementations, the trust metric 250 specifies the SR setting and/or the context where the avatars reside, a respective trust level among the avatars in such context, corresponding avatar social interaction criteria, and/or the nature of attenuation in case of breaching the avatar social interaction criteria, among others.

For example, in a boxing event or close collaboration, where contact and/or overlapping between two avatars in the same SR space are expected, the trust level is high. Accordingly, the avatar social interaction criteria may not be set and the avatars are fully visible when the avatars interact with each other in close distance. In another example, in close collaboration context, the avatar social interaction criteria may be set, such that the avatars align or track each other for providing co-user interactions in the same SR space. In contrast, when unacquainted avatars first meet, the mutual trust level is low. As such, avatar social interaction criteria, e.g., one or more threshold distances between two avatars, are set and used to determine the levels of attenuation. If an avatar comes closer than a first threshold distance at a meeting place, avatar social interaction criteria are breached. Accordingly, at least one avatar becomes at least partially attenuated in accordance with some implementations. When the stranger avatar further breaches the second threshold distance, in some implementations, at least one avatar can become invisible.

The spectrum of attenuation 200 and the exemplary trust metric 250 shown in FIGS. 2A and 2B are from various perspectives. For example, in an SR scene where avatar A represents user A and avatar B represents user B, avatar A's trust level of avatar B is high. As such, when avatar B moves within a threshold distance from avatar A, no attenuation is displayed in the virtual scene from user A's perspective. On the other hand, avatar B's trust level of avatar A may not be high. As such, from user B's perspective, certain degree of attenuation is displayed in the SR scene. Further, even when two avatars share the same trust metric and the same set of avatar social interaction criteria, the attenuation can be displayed differently for different users as will be described below with reference to FIG. 4.

Figure 4:
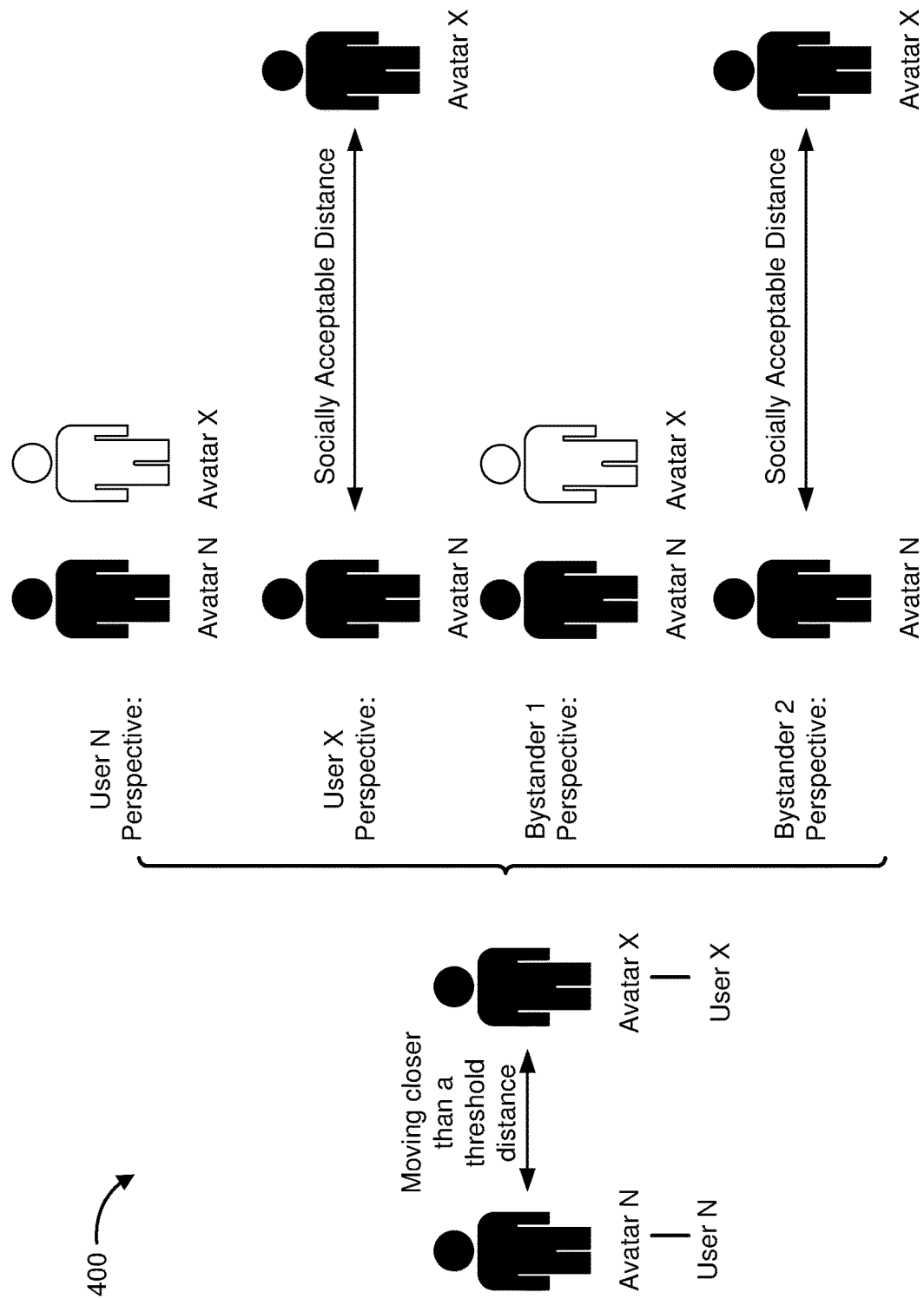
FIG. 4 illustrates attenuation of co-user interactions from various perspectives in accordance with some implementations.

FIG. 4 is a block diagram 400 illustrating attenuation of co-user interactions from various perspectives in accordance with some implementations. In one exemplary scenario, avatar N representing user N is too close to avatar X representing user X in the SR setting. Based on the trust metric of both N and X and the corresponding avatar social interaction criteria, certain degree of attenuation is generated. From user N's perspective (e.g., display of the scene 106 on the SR device 104-N of the user 10-N as shown in FIG. 1), avatar X is attenuated, e.g., faded, blinked, shrank, or other animation indicating the breaching of the avatar social interaction criteria. From user X's perspective, however, avatar N and avatar X are fully visible and are at a socially acceptable distance in some implementations, as if avatar N did not move into avatar X's space. As such, user X would not be distracted by avatar N who is too close, yet avatar N be led into believing that she has succeeded in disturbing avatar X.

FIG. 4 also shows that a bystander may or may not see the co-user interaction in the SR scene. For example, the first bystander in a supervisory role can be shown the close encounter between avatar N and avatar X as well as the attenuation of avatar X in some implementations. In contrast, the second bystander in a lessor role may not see the close encounter between avatars N and X and may be provided a view similar to user X's. In some implementations, the determination of whether to display the attenuation to a bystander and the degree of attenuation are based at least partially on the trust metric as described above with reference to FIGS. 2A and 2B.

FIGS. 5A-5J illustrate exemplary user interfaces of attenuation of user interactions in SR space in accordance with some implementations. The user interfaces in these figures are used to illustrate the processes described below, including the process in FIG. 7. In some implementations, the exemplary user interfaces are displayed to a first user of an SR device, e.g., the device 104 in FIG. 1. Thus, the exemplary user interfaces are from the first user's perspective. Further, the device can detect inputs via an input device that is separate from the display (e.g., a head mounted device (HMD) with voice activated commands, a laptop with a separate touchpad and display, or a desktop with a separate mouse and display).

Figure 5A:
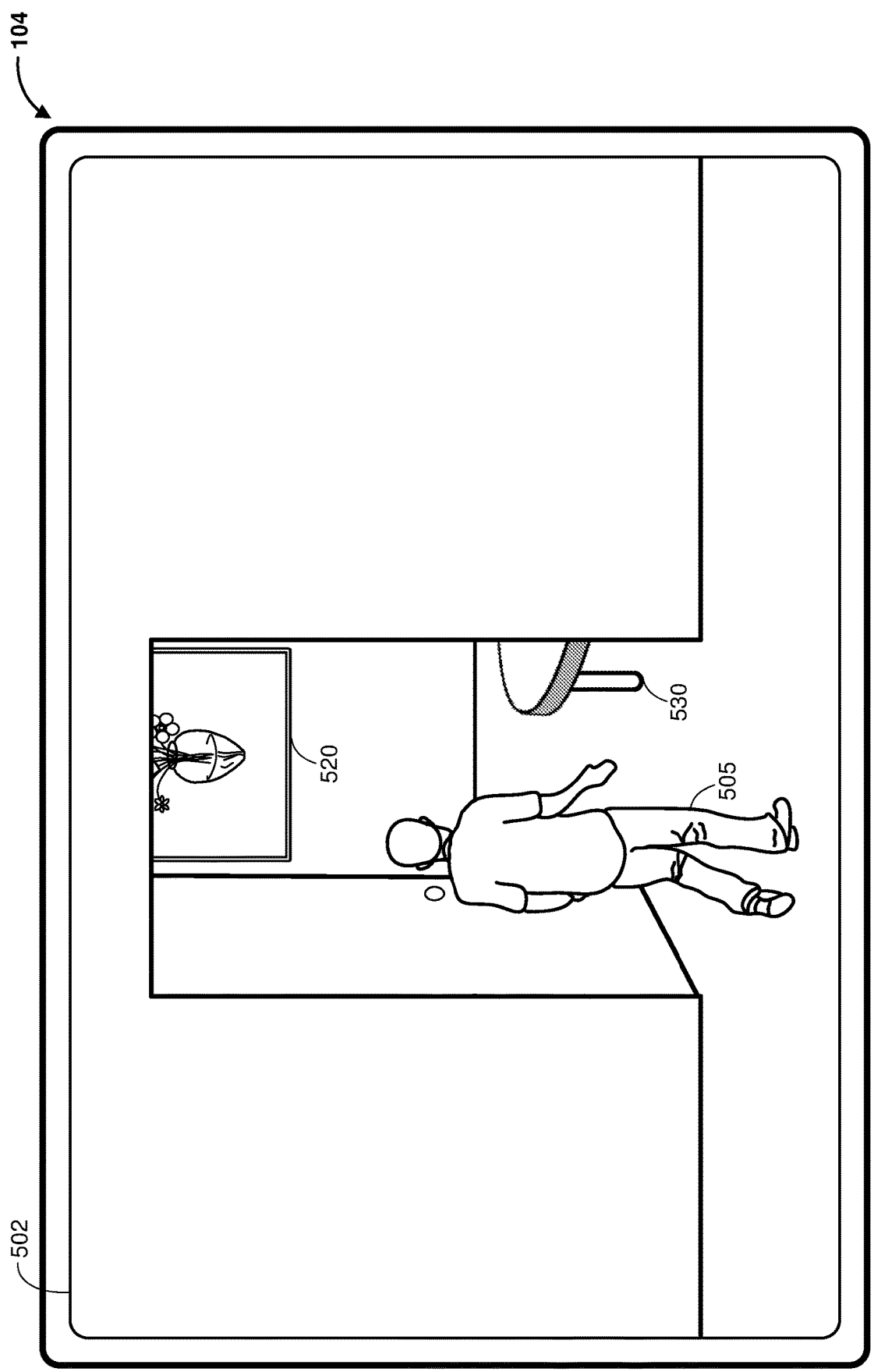
FIGS. 5A-5J illustrate exemplary user interfaces of attenuation of user interactions in SR setting in accordance with some implementations.

As shown in FIG. 5A, the device 104 displays a media interaction interface 502. According to some implementations, the media interaction interface 502 displays a scene with subjects in a field of view of an image sensor, which is part of or connectable to the device 104 worn by the first user. The image data (or pass-through image data) representing the scene are captured by the image sensor. In some implementations, the pass-through image data includes a preview image, a surface image (e.g., planar surface), depth mappings, anchor coordinates (e.g., for depth mappings), and/or the like. In some implementations, the pass-through image data includes not only visual content, but also includes audio content, 3D renderings, timestamps (of actual frame displayed), a header file (e.g., camera settings such as contrast, saturation, white balance, etc.), and/or metadata.

As explained above with reference to FIG. 1, in some implementations, the image sensor for capturing the scene is part of the device 104 or attached to the device 104; while in some other implementations, the image sensor is detached from the device 104, e.g., on a camera remote from the device. In various implementations, the scene changes as the field of view of the image sensor changes, as is described below with reference to FIGS. 5B-5J. In FIG. 5A, the media capture preview includes an open doorway and an avatar 505 representing a second user entering the open doorway. Through the open doorway, the media capture preview shows portions of a picture frame 520 and a table 530 in the room.

Figure 5B:
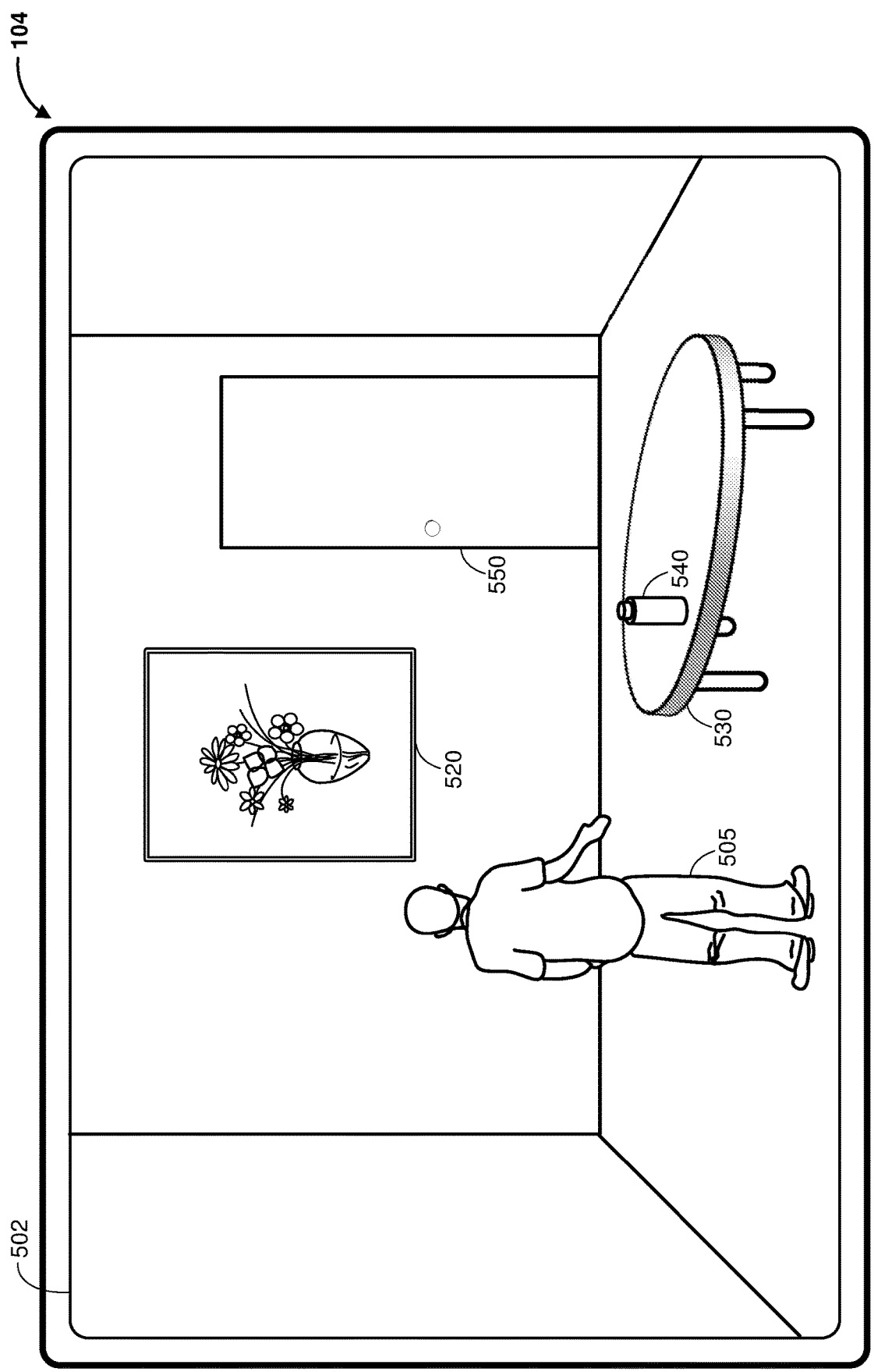

FIGS. 5B-5F illustrate attenuating SR content in the media interaction interface 502 based on interactions of the avatar 505 representing the second user within the SR setting in accordance with some implementations. The perspective or vantage point of the image sensor changes between FIGS. 5A and 5B-5D. For example, in FIG. 5B, the doorway is no longer displayed in the media interaction interface 502, indicating that the avatar 505 has entered the room. As the avatar 505 enters the room, as shown in FIG. 5B, the media interaction interface 502 displays three walls of the room with the picture frame 520 and the table 530 in the room. Additionally, as shown in FIG. 5B, the media interaction interface 502 displays a can of spray paint 540 on the table 530 and a backdoor 550.

Figure 5C:
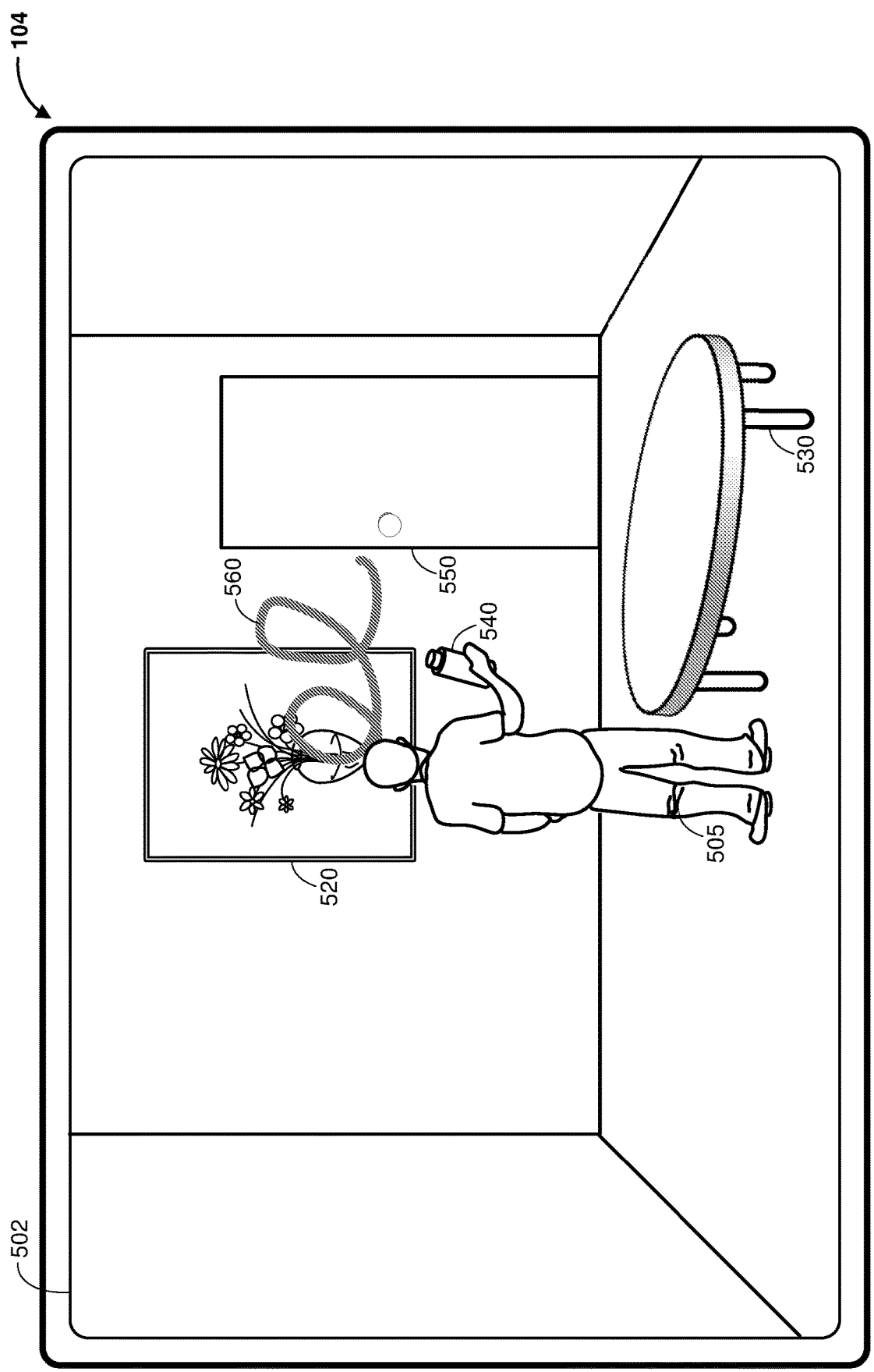

In FIG. 5C, the avatar 505 picks up the spray can 540 from the table 530 and sprays paint 560 on the painting 520 and the wall where the painting 520 hangs. In some implementations, the behavior pattern of spraying the painting 520 and the wall breaches avatar social interaction criteria of the first user or another user (not shown).

Figure 5D:
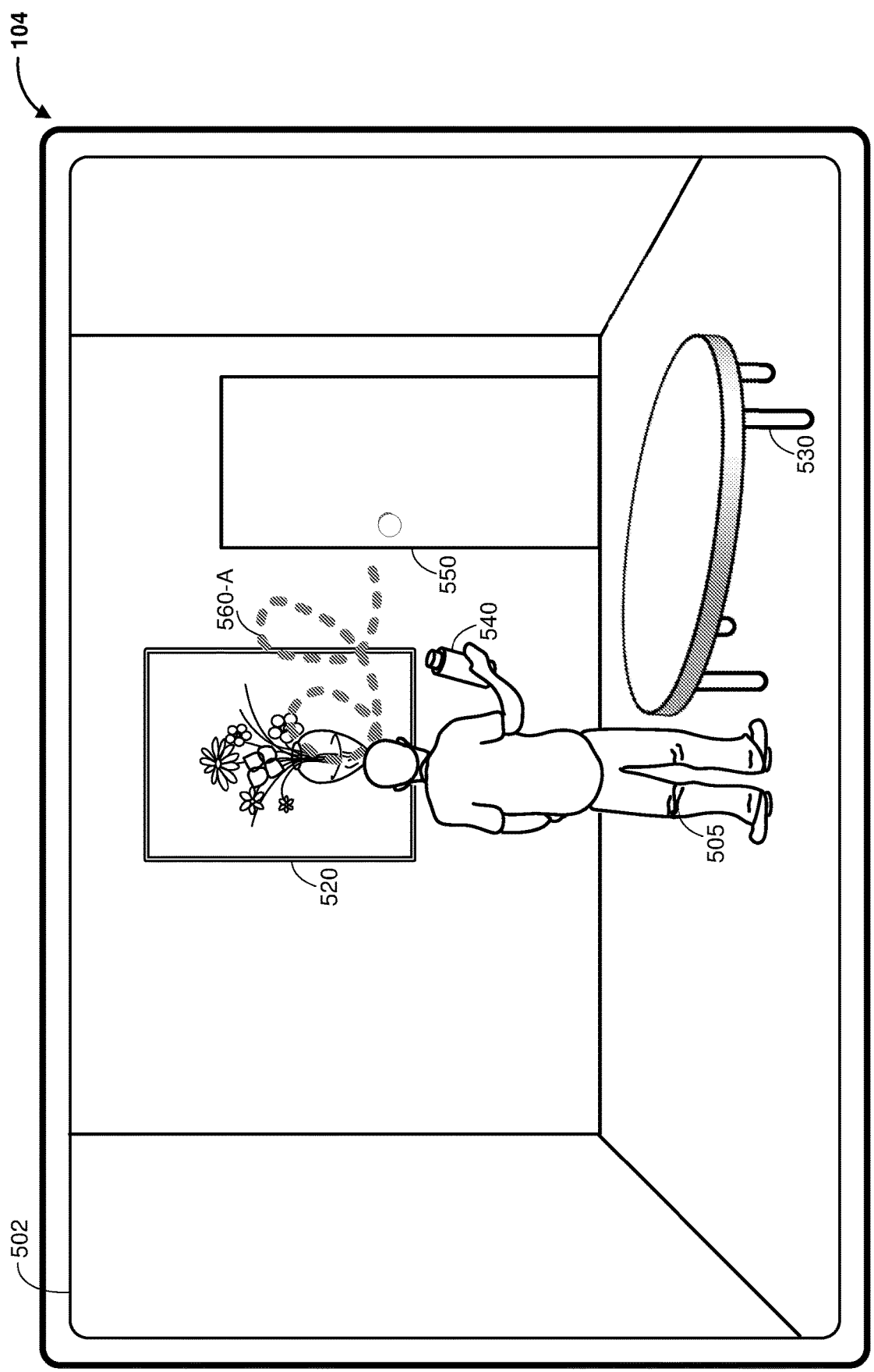
Figure 5E:
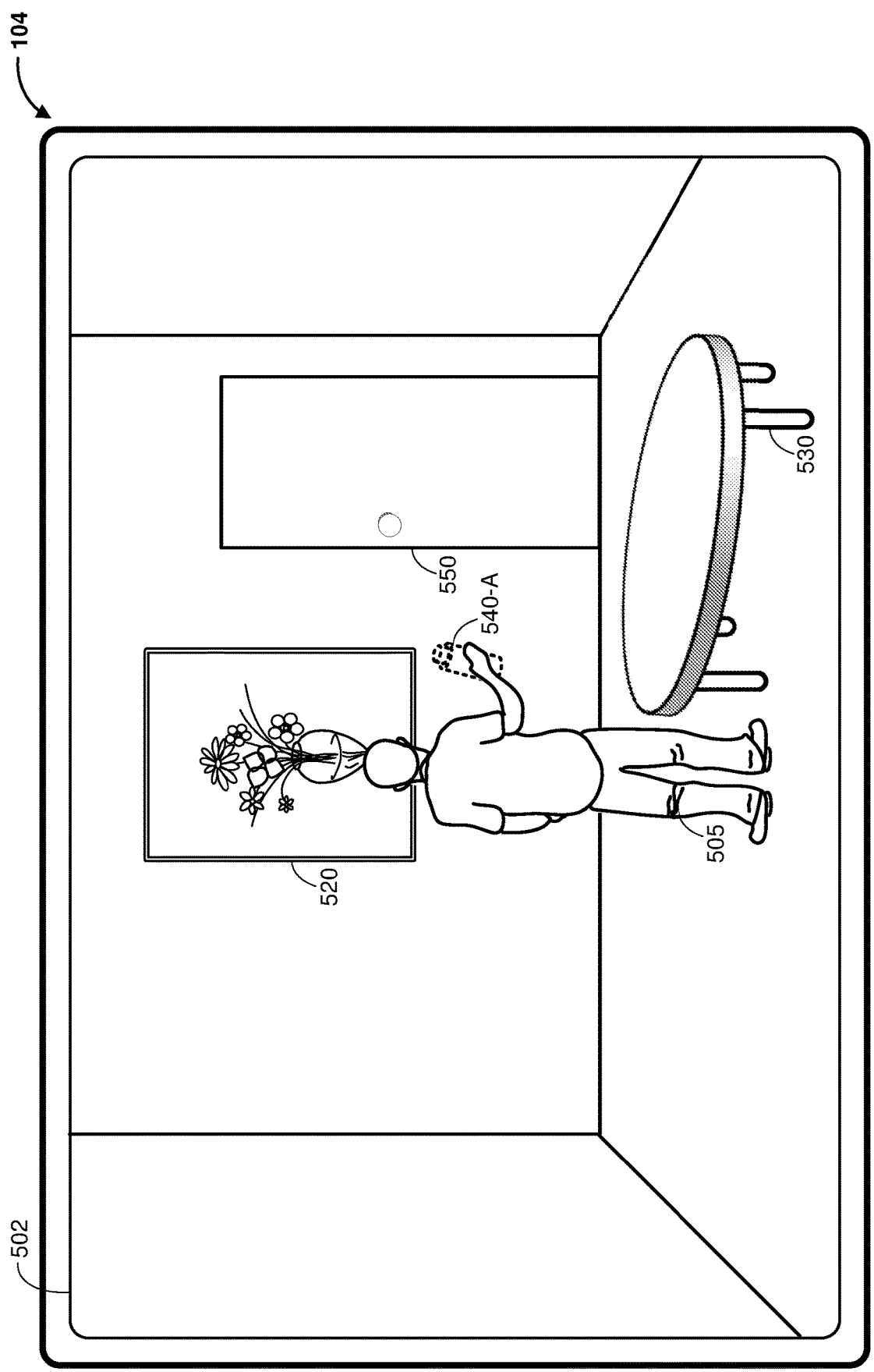
Figure 5F:
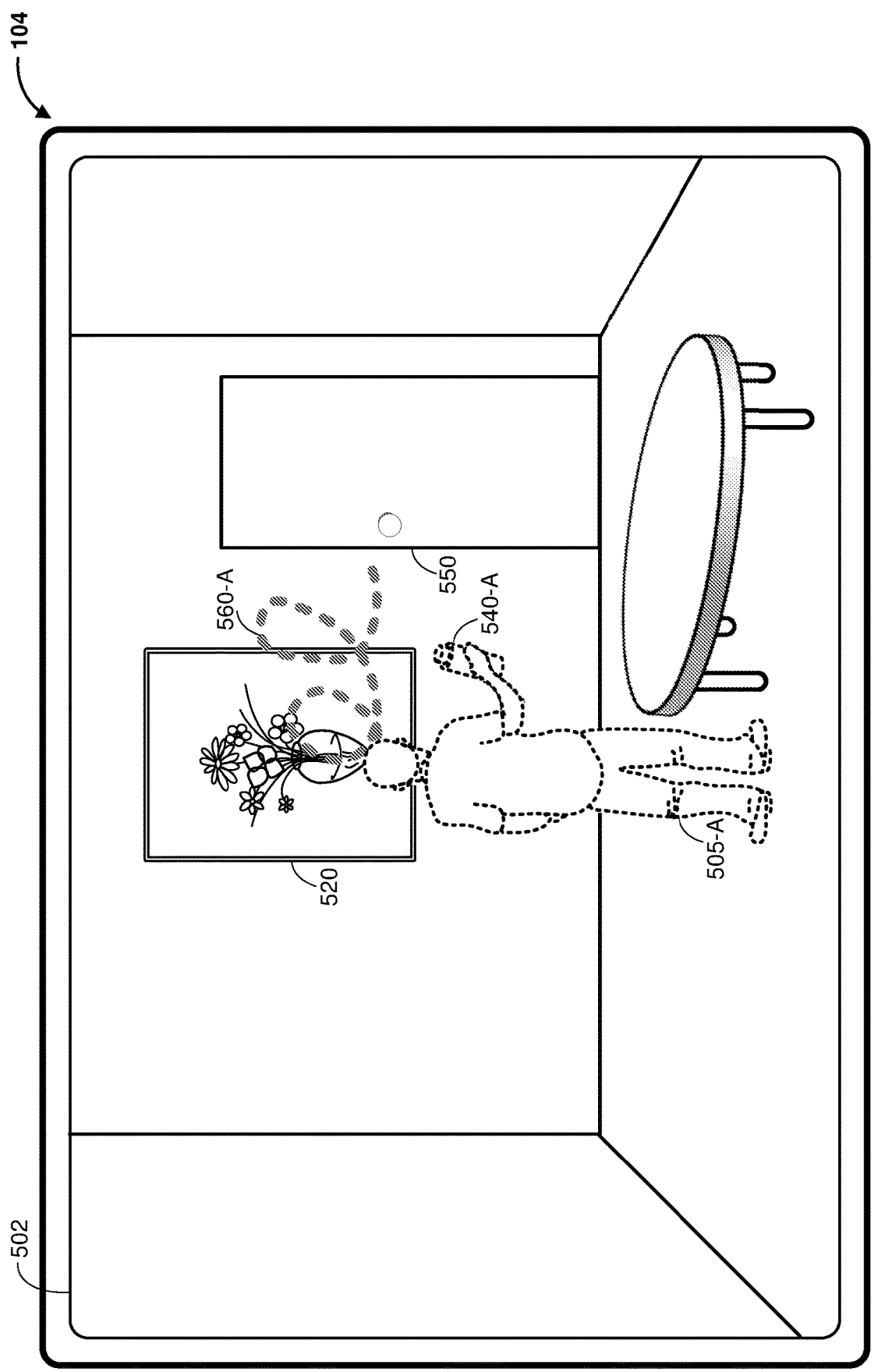

FIGS. 5D-5F illustrate various degrees of attenuation in response to the breaching the avatar social interaction criteria. For example, as shown in FIG. 5D, in the media interaction interface 502, graffiti 560-A are attenuated. In another example, as shown in FIG. 5E, the graffiti is removed and a spray can 540-A that is used by the avatar 505 to breach the avatar social interaction criteria is faded. In yet another example, as shown in FIG. 5F, avatar 505-A that sprayed the graffiti 560-A with the spray can 540-A is faded along with the spray can 540-A and the graffiti 560-A.

Figure 5G:
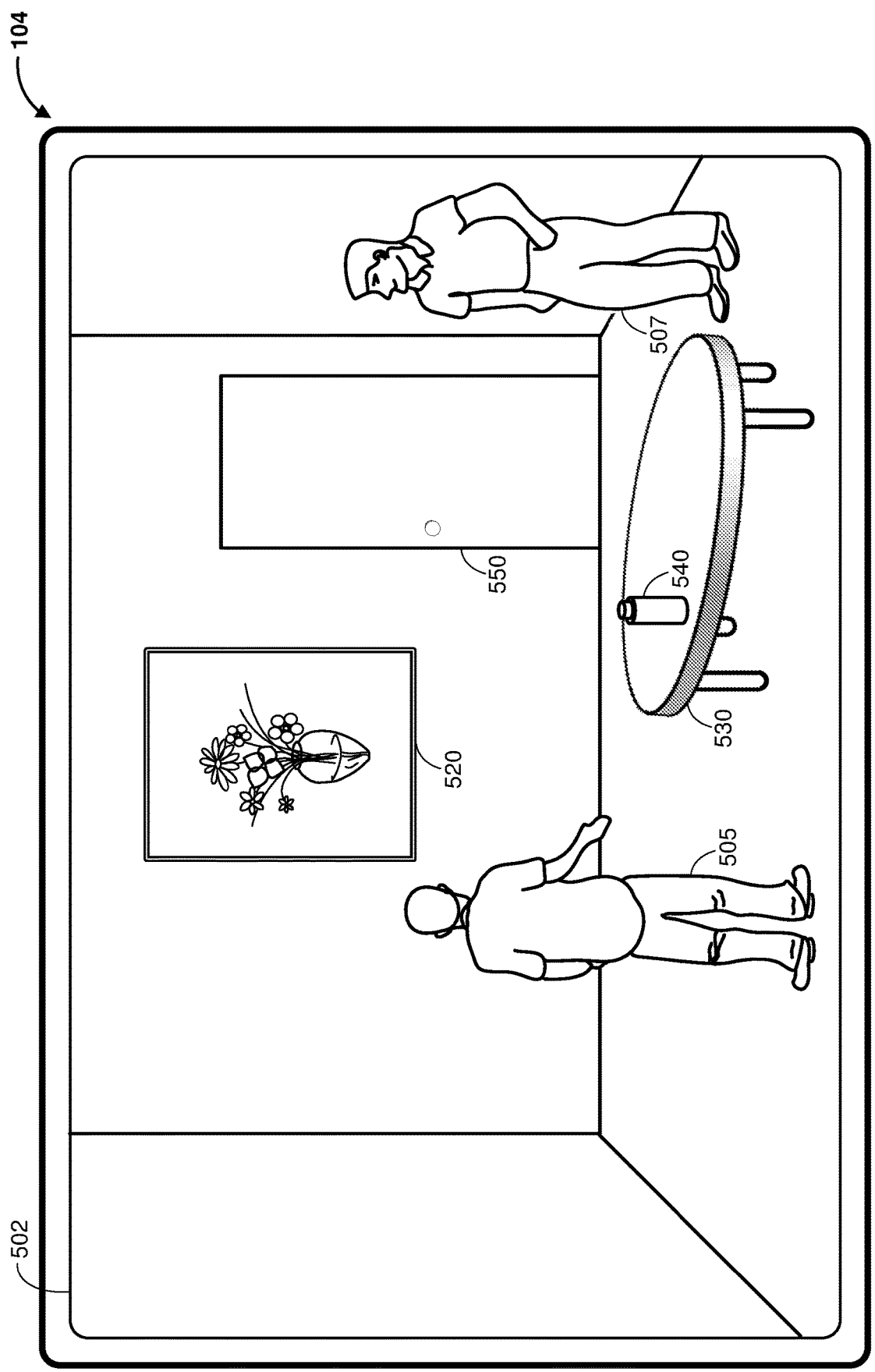

FIGS. 5G-5J illustrate attenuating SR content in the media interaction interface 502 based on co-user interactions in the SR space in accordance with some implementations. In FIG. 5G, the media interaction interface 502 displays the picture frame 520, the table 530 and the avatar 505 representing the second user and the avatar 507 representing the first user. Additionally, as shown in FIG. 5G, the media interaction interface 502 displays the can of spray paint 540 on the table 530 and a backdoor 550.

Figure 5H:
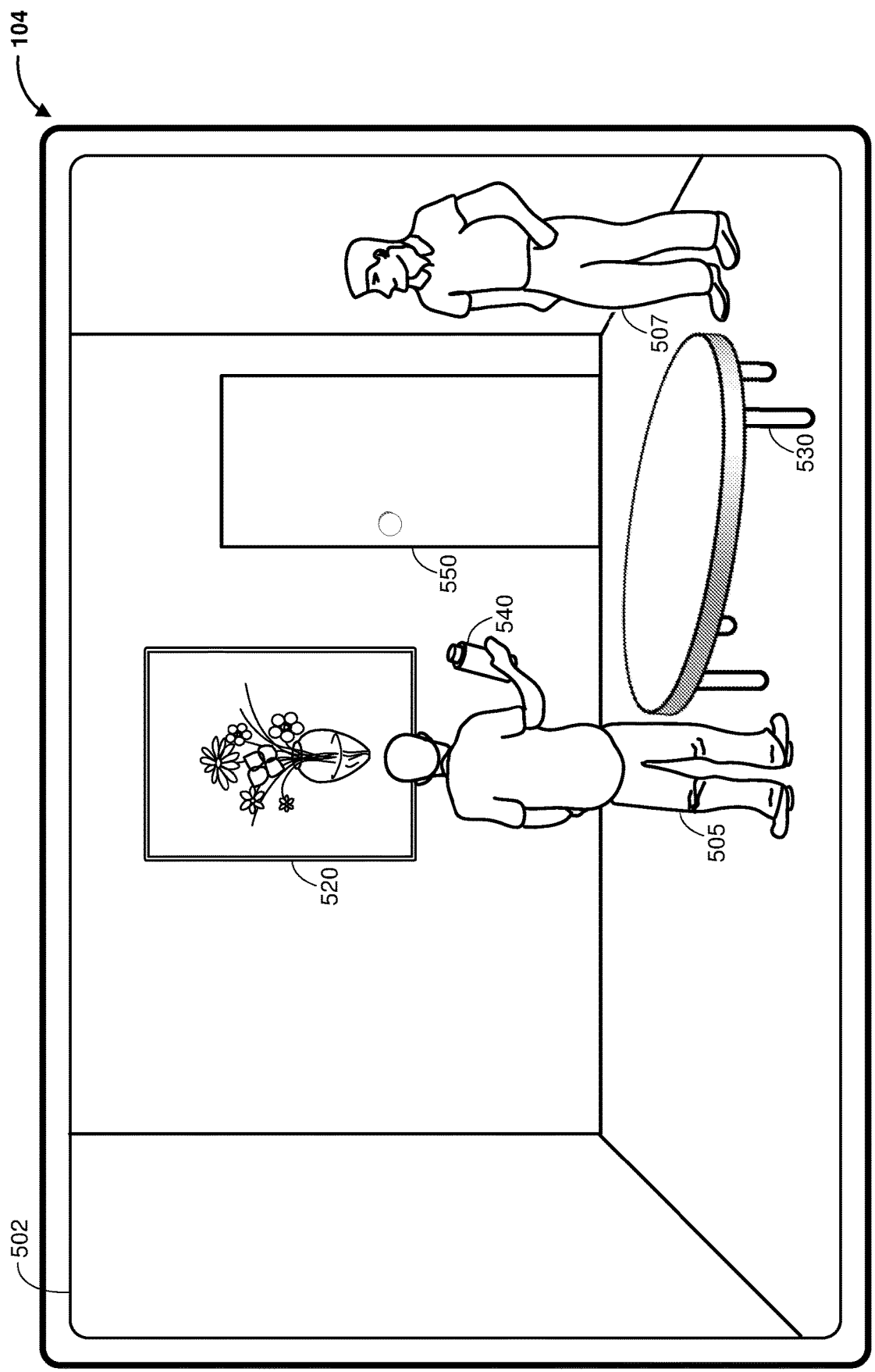

In FIG. 5H, the avatar 505 representing the second user picks up the spray can 540 from the table 530. In some implementations, the behavior pattern of the avatar 505, e.g., waving the spray can 540 in close proximity to the avatar 505, breaches one or more avatar social interaction criteria. For instance, waving the spray can 540 by the avatar 505 within a threshold distance from the avatar 507 may make the first user associated with the avatar 507 uncomfortable and thus breaches one or more avatar social interaction criteria.

Figure 5I:
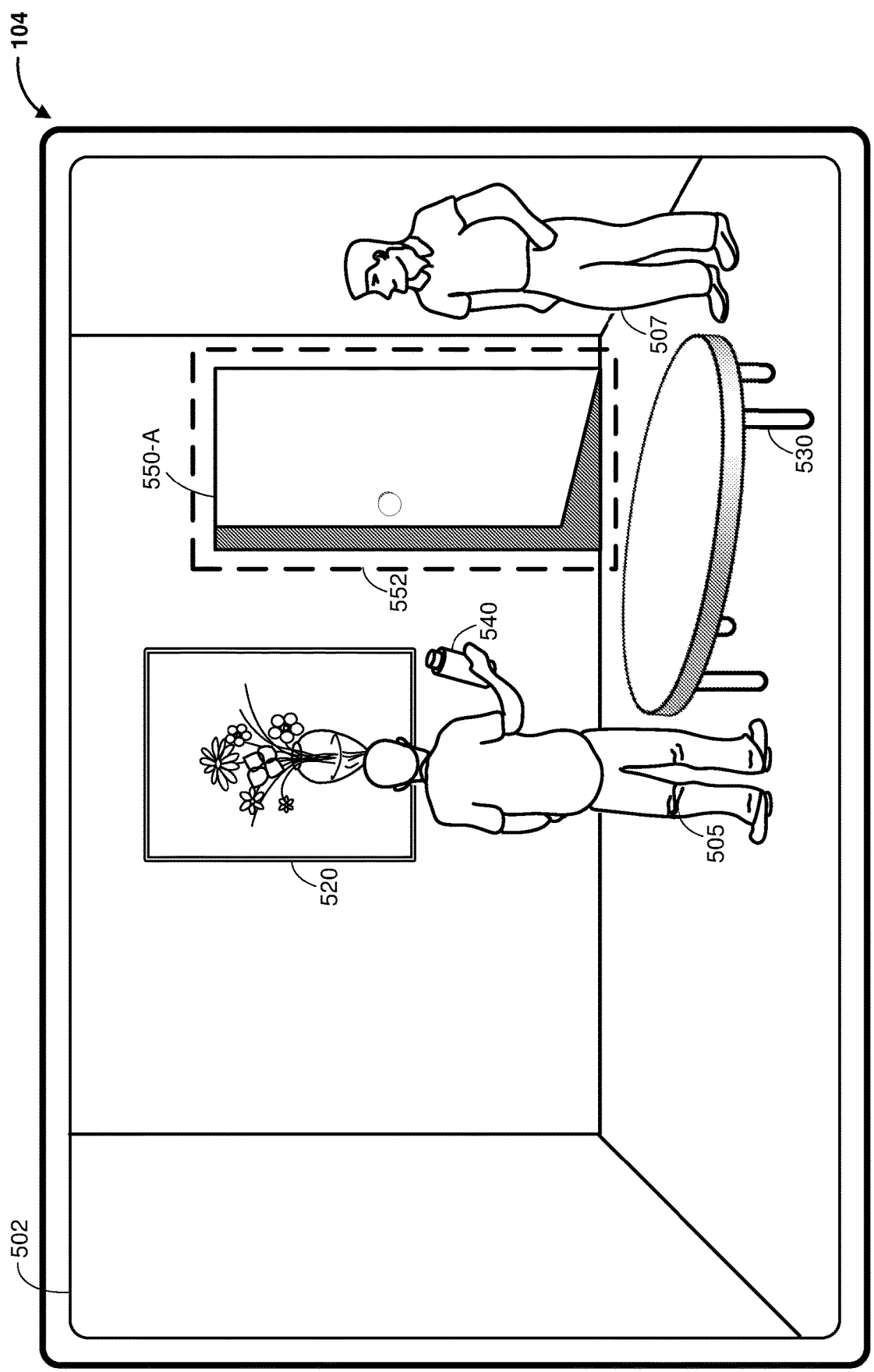
Figure 5J:
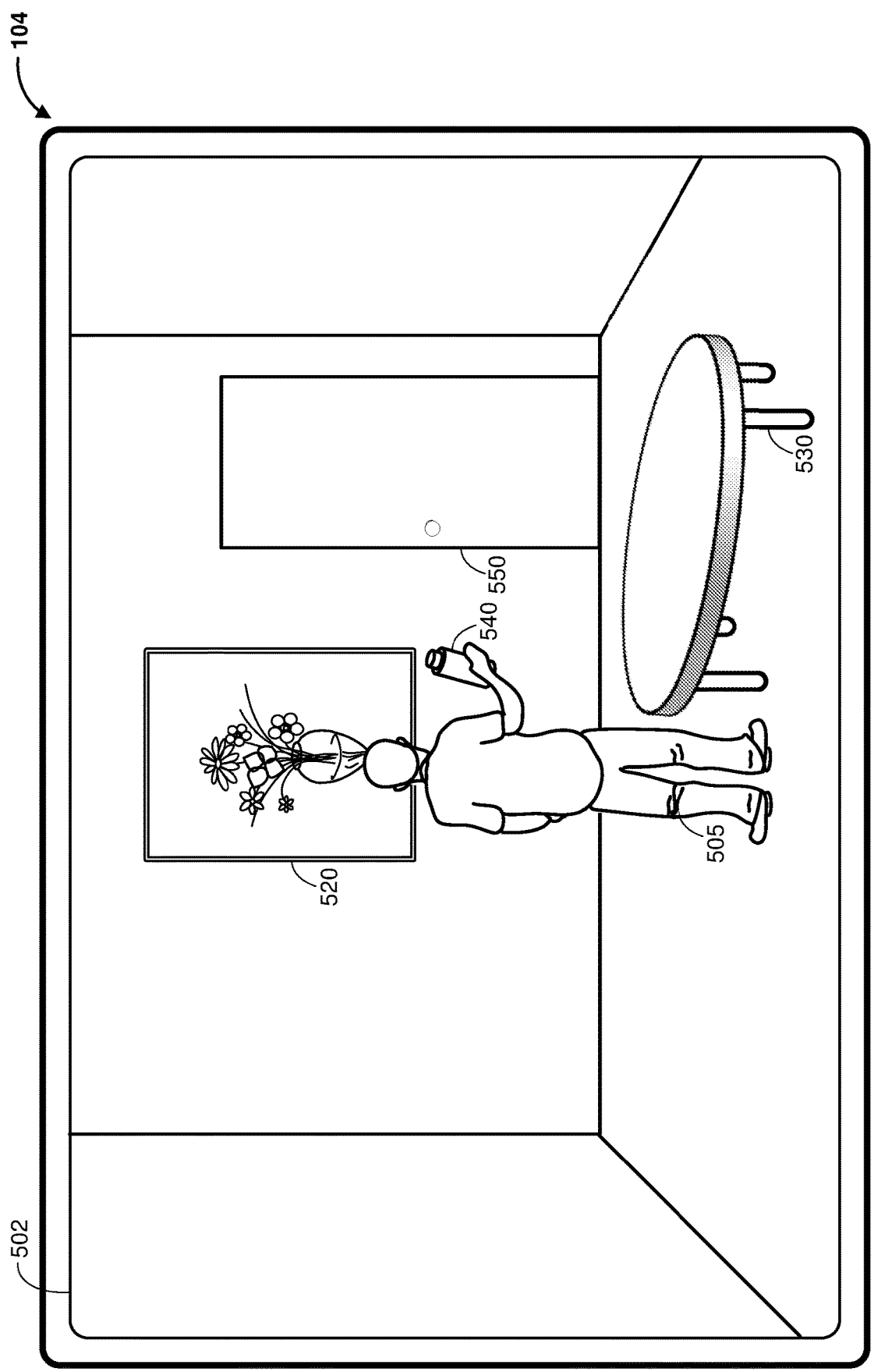

As is shown in FIG. 5I, in some implementations, in the media interaction interface 502 displayed to the first user represented by the avatar 507, an indicator 552 appears over an open back door 550-A to allow the avatar 507 to exit to a different space (e.g., away from the reach of spray can 540). As such, the attenuation is realized by moving the avatar 507 away from the scene, thereby isolating avatar 505. Accordingly, in some implementations, when a first user is breaching social interaction criteria, an affordance permits a second user to move away from the first user. Notably, the affordance (e.g., 552) need not be available to the first avatar, thereby preventing the avatar 505 with spray can 540 from chasing after avatar 507, effectively leaving avatar 505 in its own space, as shown in FIG. 5J.

FIGS. 6A-6D illustrate exemplary user interfaces of close collaboration in SR space in accordance with some implementations. The user interfaces in these figures are used to illustrate the processes described below, including the process in FIG. 8. In some implementations, the exemplary user interfaces are displayed to users of SR devices, e.g., the user 10-N of the device 104-N and the user 10-X of the device 104-X in FIG. 1. Further, the device can detect inputs via an input device that is separate from the display (e.g., a head mounted device (HMD) with voice activated commands, a laptop with a separate touchpad and display, or a desktop with a separate mouse and display).

Figure 6A:
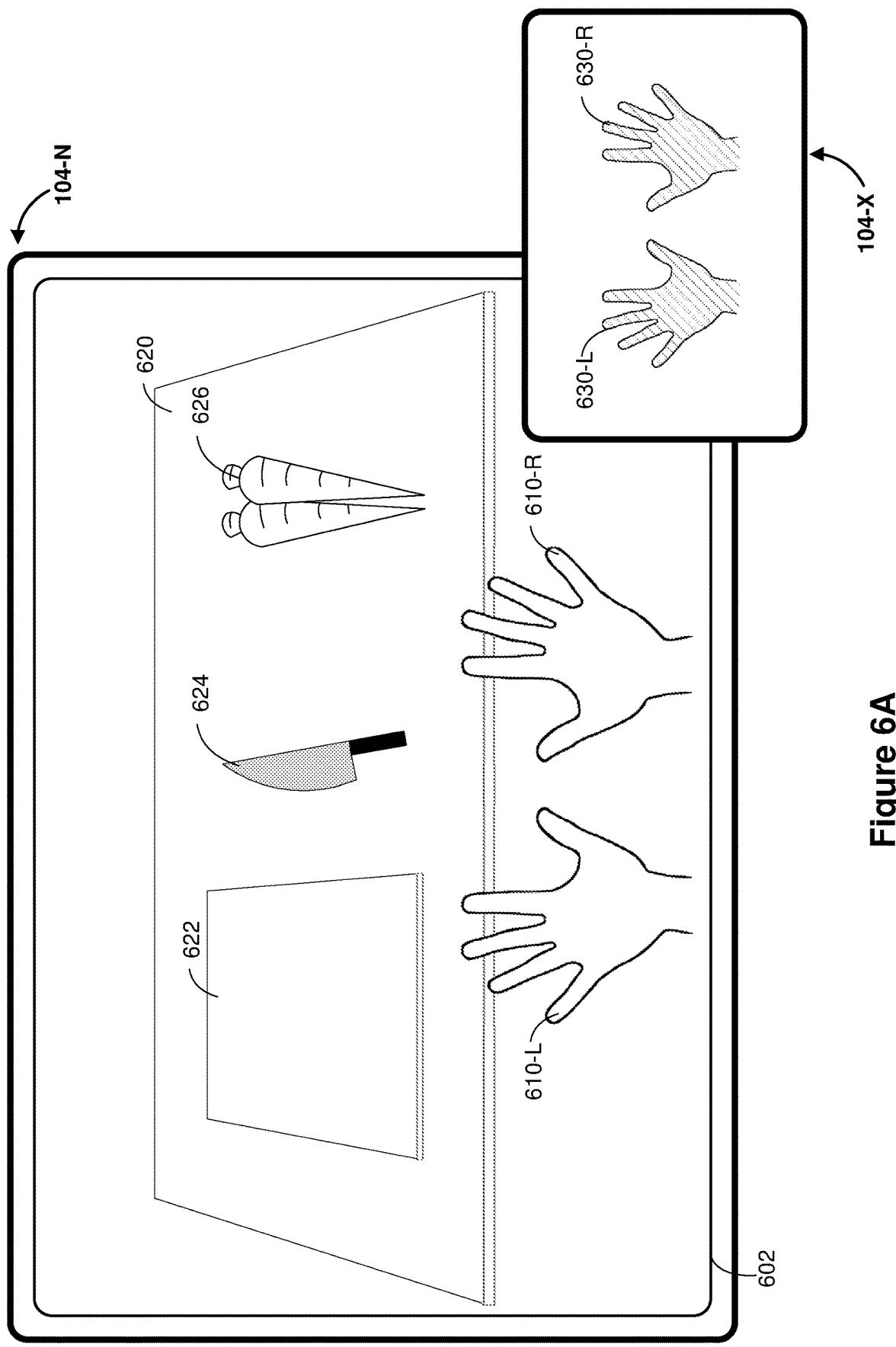

As shown in FIG. 6A, the device 104-N displays a media interaction interface 602. According to some implementations, the media interaction interface 602 displays a scene with objects in a field of view of an image sensor, e.g., a counter 620, a cutting board 622, a knife 624, and carrots 626. The media interaction interface 602 is from a first user's perspective, e.g., the user 10-N in FIG. 1. The image data (or pass-through image data) representing the scene are provided by the image sensor. In some implementations, the pass-through image data includes a preview image, a surface image (e.g., planar surface), depth mappings, anchor coordinates (e.g., for depth mappings), and/or the like. In some implementations, the pass-through image data includes not only visual content, but also includes audio content, 3D renderings, timestamps (of actual frame displayed), a header file (e.g., camera settings such as contrast, saturation, white balance, etc.), and/or metadata.

In some implementations, sensors of the device 104-N and/or sensors connectable to the device 104-N (e.g., IMU) obtain a body pose of a user of the device 104-N. The device 104-N then uses the body pose information to determine a sightline perspective of the user of the device 104-N relative to the objects 620-626. It should be noted that the sightline perspective of a user of a device can be the same or different from the field of view of the image sensor associated with the device. For example, in case of SR-enabled glasses, the camera with the image sensor and the user's optical train may be different (e.g., separate). As such, location(s) of the one or more SR content items can be determined based on the field of view of the image sensor or the user. Alternatively, the field of view of the image sensor and the user can be reconciled, e.g., one may overlay the other. In such implementations, location(s) of the one or more SR content items can be determined based on the field of view of the image sensor and the user.

In FIG. 6A, in some implementations, based on the body pose information obtained by sensors (e.g., IMU) and the image data obtained by the image sensors, the hands 610L and 610R of the first user are displayed adjacent to the counter 620 in preparation for julienning the carrots 626. Further shown in FIG. 6A, the device 104-X obtains the body pose information, e.g., positions of hands 630L and 630R of the second user. In some implementations, instead of using the body pose information for compositing the scene displayed in the media interaction interface 602, the SR content is pre-recorded. In other words, the SR content can be pre-recorded content or live cooperation content or a combination of both.

In FIG. 6B, the device 104-N obtains the body pose information from the device 104-X, determines a sightline perspective of the second user relative to the objects 620-626, and renders the hands 630 of the second user into the media interaction interface 602, e.g., superimposing the left hand 630-L1 and the right hand 630-R1 of the second user (e.g., a teacher) on the left hand 610-L and the right hand 610-R of the first user (e.g., a student).

Figure 6C:
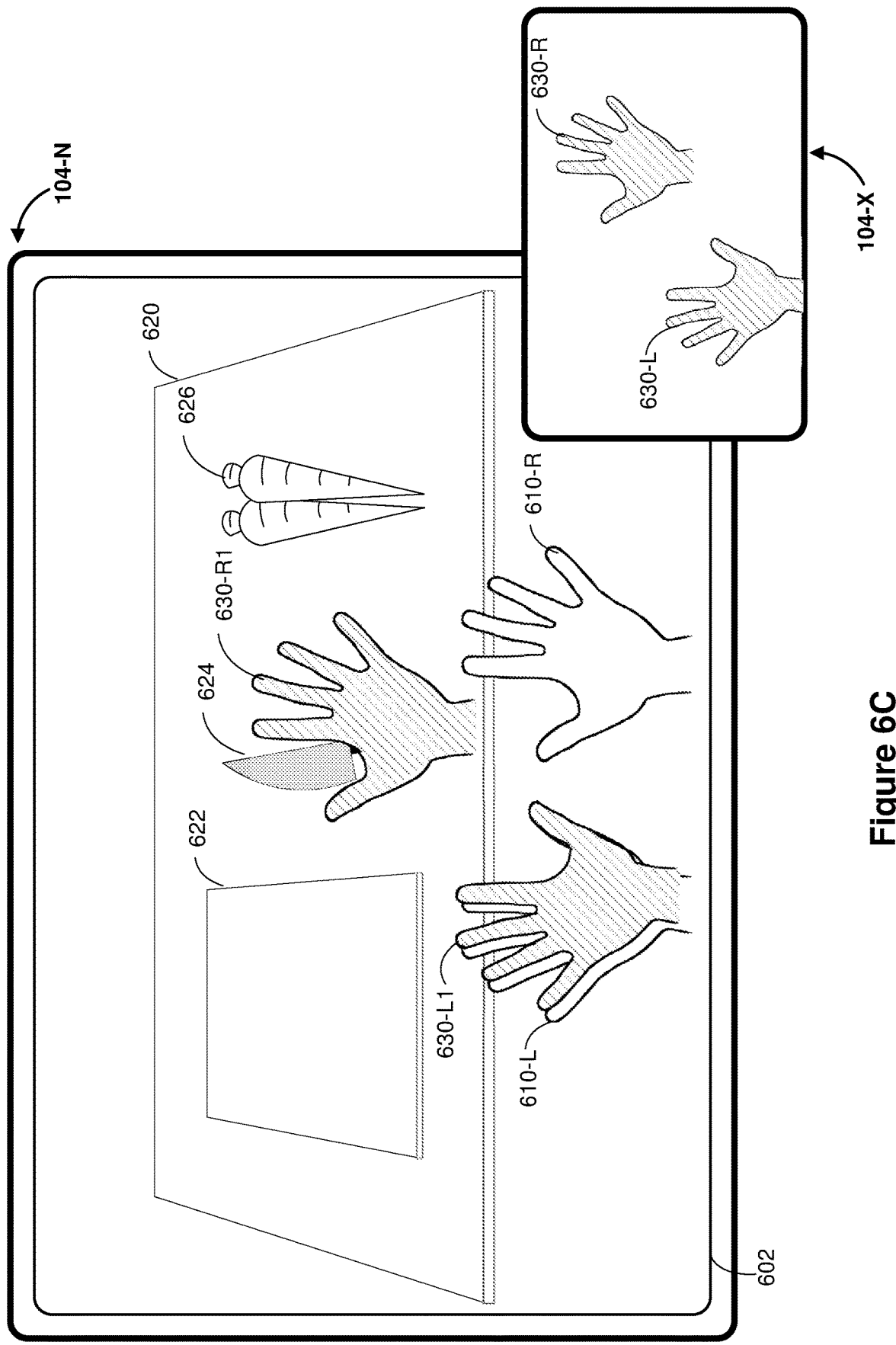

In FIG. 6C, the device 104-X obtains updated body pose information, e.g. the right hand 630-R moves up. The device 104-N subsequently obtains the updated body pose information from the device 104-X and renders movements of the right hand 630-R1 to a handle of the knife 624.

Figure 6D:
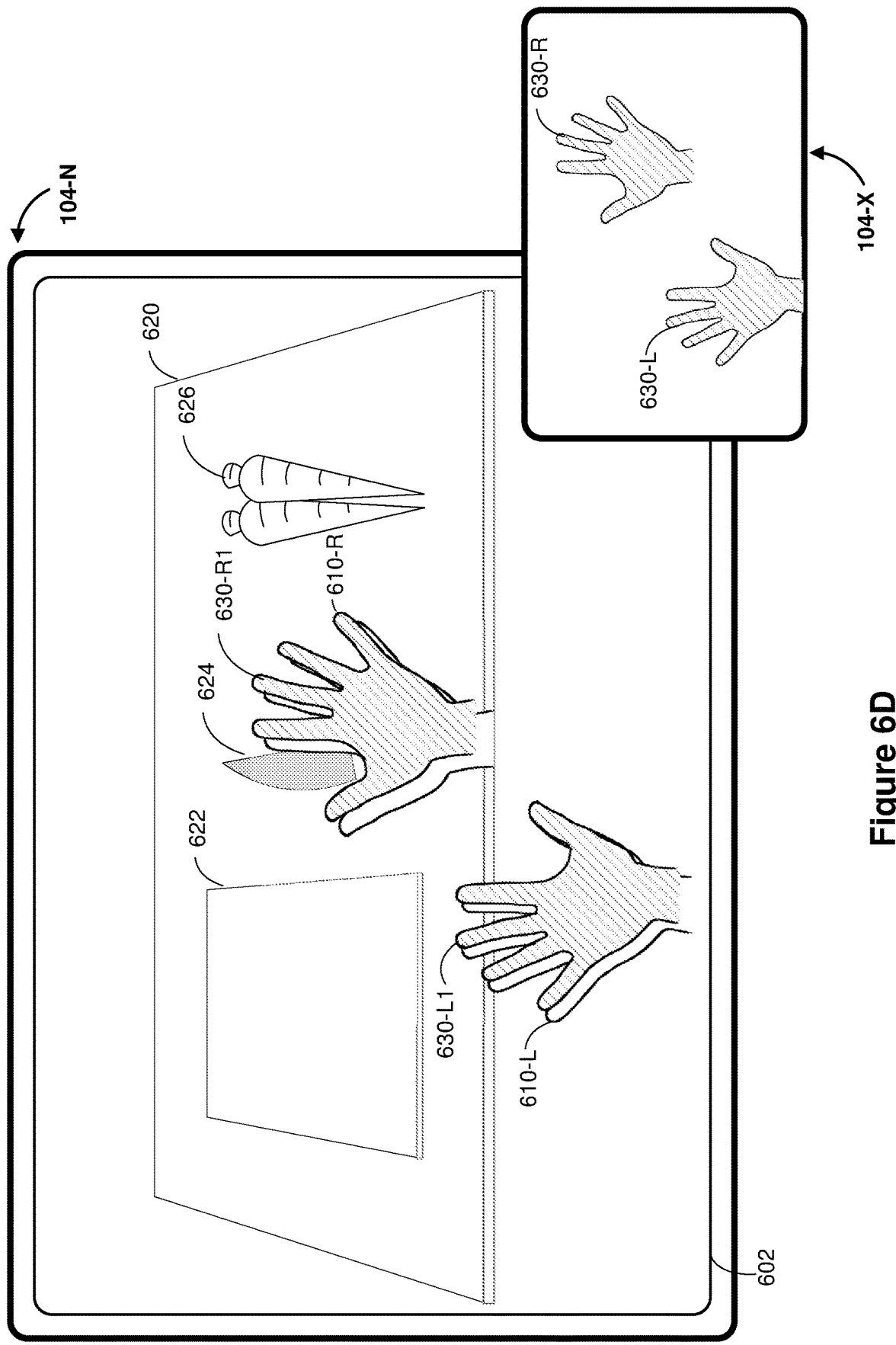

In FIG. 6D, the device 104-N updates the sightline perspective of the first user by moving the right hand 610-R close to the right hand 630-R or aligns the right hand 610-R with the right hand 630-R. As such, the first user and the second user can collaborate in the same virtual space.

Figure 7:
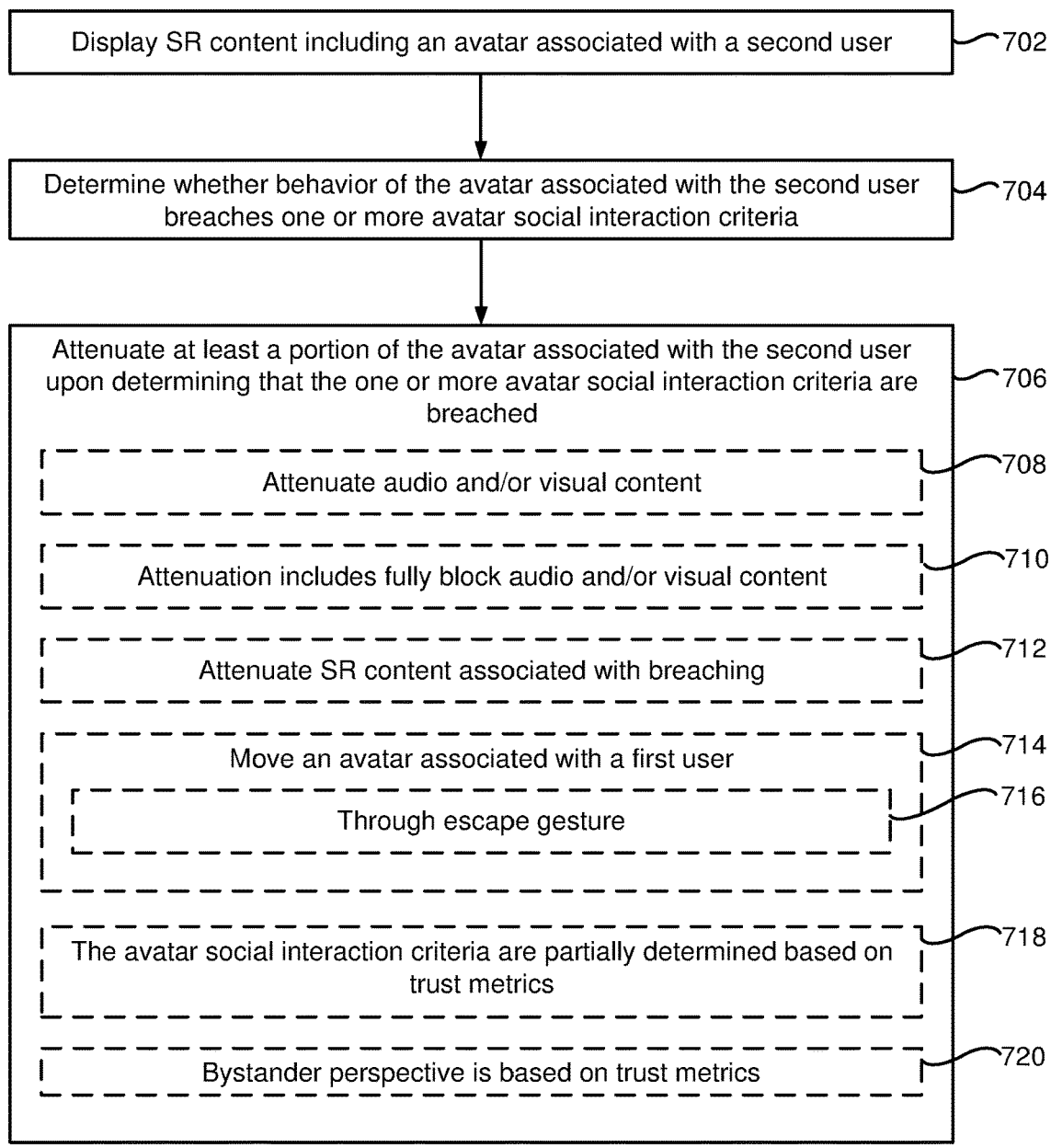
FIG. 7 is a flowchart representation of a method of attenuation of avatars based on a breach of avatar social interaction criteria in accordance with some implementations.

FIG. 7 is a flowchart representation of a method 700 of attenuation of avatars based on a breach of avatar social interaction criteria in accordance with some implementations. In various implementations, the method 700 is performed by a device with one or more processors, non-transitory memory, one or more displays, and one or more audio speakers. In some implementations, the method 700 is performed by processing logic, including hardware, firmware, software, or a combination thereof. In some implementations, the method 700 is performed by a processor and/or a controller (e.g., the controller 102 in FIG. 1) executing instructions (e.g., code) stored in a non-transitory computer-readable medium (e.g., a memory). Briefly, in some circumstances, the method 700 includes: displaying SR content to a first user using the one or more displays, the SR content including an avatar associated with a second user; determining whether behavior of the avatar associated with the second user breaches one or more avatar social interaction criteria; and attenuating at least a portion of the avatar associated with the second user according to a determination that the one or more avatar social interaction criteria are breached.

The method 700 begins, in block 702, with the device, displaying SR content to a first user using the one or more displays, the SR content including an avatar associated with a second user. For example, in FIGS. 5A-5J, the media interaction interface 502 is displayed to a first user (not show) and the SR scene displayed in the media interaction interface 502 includes the avatar 505 representing a second user.

The method 700 continues, in block 704, with the device determining whether behavior of the avatar associated with the second user breaches one or more avatar social interaction criteria. In some implementations, determining whether the behavior of the avatar associated with the second user breaches the one or more avatar social interaction criteria comprises determining whether the avatar associated with the second user has contacted a second avatar representing the user. In some implementations, determining whether the behavior of the avatar associated with the second user breaches the one or more avatar social interaction criteria comprises determining whether the avatar associated with the second user is within a threshold distance of a second avatar representing the user. In some implementations, determining whether behavior of the avatar associated with the second user breaches one or more avatar social interaction criteria comprises determining whether audio content associated with the avatar associated with the second user exceeds a threshold intensity (e.g., volume, amount of audio content, frequency of audio content such as screeches exceeding a threshold).

The method 700 further continues, in block 706, with the device attenuating at least a portion of the avatar associated with the second user according to a determination that the one or more avatar social interaction criteria are breached.

In some implementations, as represented by block 708, attenuating at least the portion of the avatar associated with the second user includes fading out at least one of audio content (e.g., intensity) via the one or more audio speakers of visual content via the one or more displays (e.g., visual is blurred or invisible). In some implementations, fading out the visual content includes blurring or other animation of the visual content. In some implementations, fading out the audio content include muffling the sound so that the user cannot make out the audio content.

Further, in some implementations, as represented by block 710, the attenuation includes fully block the audio and/or the visual content. In some implementations, attenuating at least the portion of the avatar associated with the second user includes not providing a portion of the avatar associated with the second user to the first user of the device. In some implementations, attenuating at least the portion of the avatar associated with the second user includes not providing an audio portion associated with the avatar associated with the second user to the first user of the device. For example, as shown in FIG. 3, the volume from avatar A is tuned down when the loud speech from avatar A to avatar B breaches the avatar social interaction criteria X; and the audio (or playback of the audio) from avatar A is muted when the loud speech from avatar A to avatar B breaches the avatar social interaction criteria Y.

In some implementations, as represented by block 712, attenuating at least the portion of the avatar associated with the second user includes attenuating SR content associated with the behavior of the avatar associated with the second user. For example, in FIG. 5C, the avatar 505 triggers breaching of the avatar social interaction criteria by spraying graffiti 560 on the painting 520 and the wall. Subsequently, in FIGS. 5D-5F, the graffiti 560-A, the spray can 540-A, and the avatar 505-A are partially attenuated or made fully invisible.

In some implementations, as represented by block 714, the method 700 further includes receiving an input from the first user, determining whether the received input is a predetermined gesture, and in accordance with determining that the received input is the predetermined gesture, moving the avatar to a location in the SR content outside a field of view displayed by the second device. In other words, at least a portion of an avatar associated with the first user is moved to a location in an SR scene, where the avatar associated with the second user is not present, e.g., separating the avatars in close distance by moving them away from each other to a socially acceptable distance as shown in FIG. 4. Further, in some implementations, the received input is a predefined gesture, such as a relocation gesture input.

For example, in FIG. 5H, the avatar 505 triggers breaching of avatar social interaction criteria, e.g., too close in distance with the avatar 507 and/or waving the spray can 540 when in close distance with the avatar 507. In FIG. 5I, the indicator 552 is displayed around the open backdoor 550-A. In response to a relocation gesture, such as tapping on the indicator 552, the avatar 507 can exit the room to be separated from the avatar 505. As shown in FIG. 5J, after the avatar 507 exits the room, the avatar 505 is left alone in the room.

In some implementations, less cooperative behaviors include getting too close, speaking loudly, speaking offensively, or damaging the shared SR setting, etc. As such, the avatar social interaction criteria can include threshold distances, threshold volume, behavior patterns, rules, and guidelines for avatars in accordance with some implementations. In some implementations, as represented by block 718, the avatar social interaction criteria are determined based at least in part on trust metrics, including context of avatar social interactions and trust levels for the context. Further, in some implementations, as represented by block 720, the method 700 includes providing at least a portion of the avatar associated with the first user and at least a portion of the avatar associated with the second user to a third user based on trust metrics associated with the third user.

For example, as shown in FIGS. 2A and 2B, restraints are lower for boxing events and close collaboration, restraints are medium for family gather, and restraints are higher for meeting strangers. Accordingly, the avatar social interaction criteria are set differently and the spectrum of attenuation is different for different situations. In another example, as shown in FIG. 4, the first bystander sees the attenuation of avatar X, while the second bystander does not see the attenuation, due to the difference in trust metrics associated with the bystanders.

In some implementations, the method 700 further includes in accordance with a determination that the one or more avatar social interaction criteria are breached, instructing a second device to attenuate at least a portion of a second avatar representing the first user, wherein the second device is external to the device, and the second avatar representing the first user is displayed by the second device. For example, in FIGS. 5H-5J, the avatar 505 was too close in distance with the avatar 507 and/or waving the spray can 540 when in close distance with the avatar 507, thus behaviors of the avatar 505 breach the one or more social interaction criteria. A second device displaying the SR setting to the first user represented by the avatar 507 can receive instructions to attenuate the avatar 507 such that the avatar 507 is attenuated, e.g., exiting the room to be separated from the avatar 505.

Figure 8:
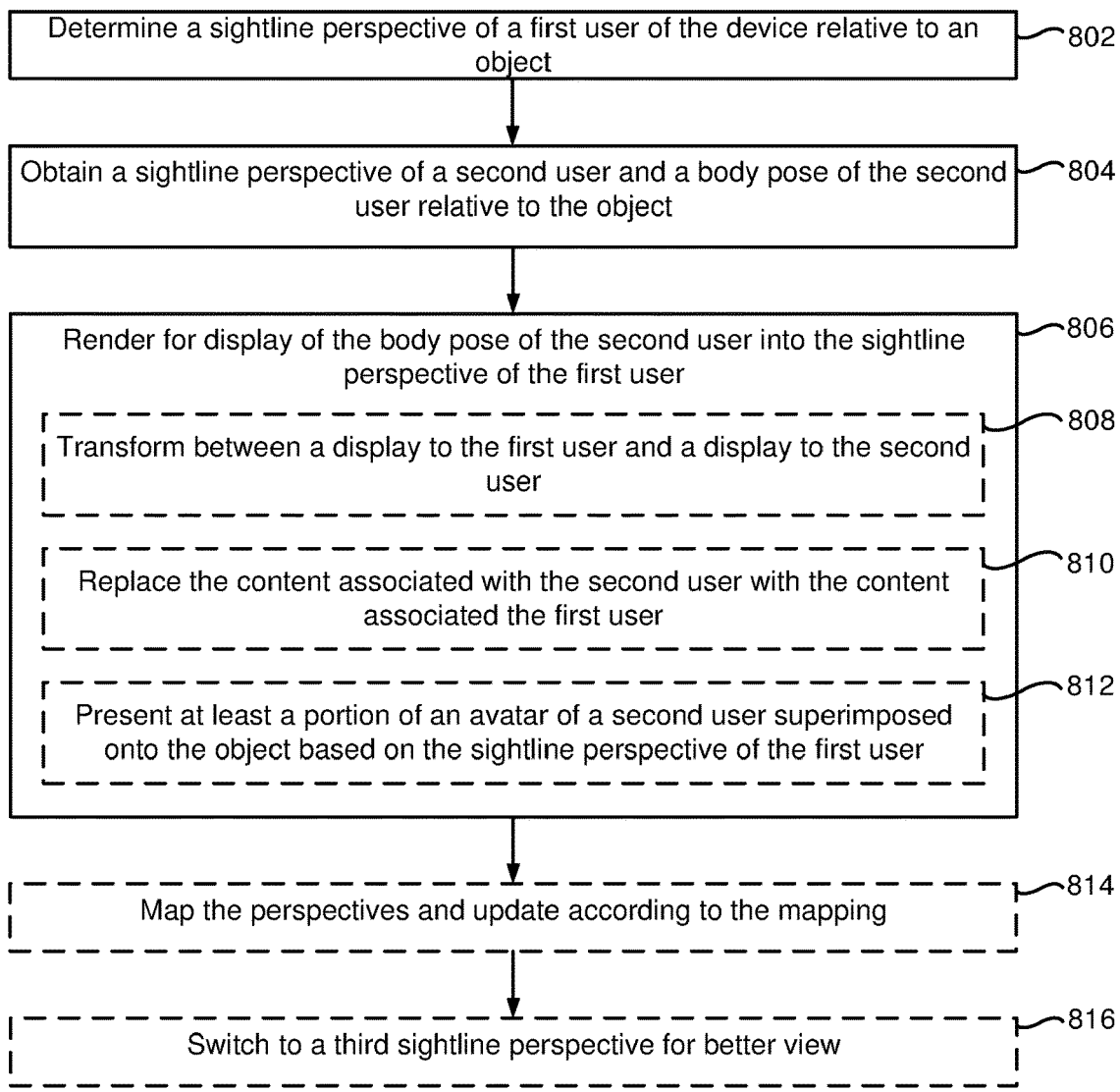
FIG. 8 is a flowchart representation of a method of co-user close interactions in SR setting in accordance with some implementations.

FIG. 8 is a flowchart representation of a method 800 of co-user close interactions in SR space in accordance with some implementations. In various implementations, the method 800 is performed by a device with one or more processors, non-transitory memory, one or more displays, and one or more audio speakers. In some implementations, the method 800 is performed by processing logic, including hardware, firmware, software, or a combination thereof. In some implementations, the method 800 is performed by a processor and/or a controller (e.g., the controller 102 in FIG. 1) executing instructions (e.g., code) stored in a non-transitory computer-readable medium (e.g., a memory). Briefly, in some circumstances, the method 800 includes: determining a sightline perspective of a first user of the device relative to an object; obtaining a sightline perspective of a second user and a body pose of the second user relative to the object; and rendering for display of the body pose of the second user into the sightline perspective of the first user. In some implementations, the method 800 includes enabling a close collaboration mode so that the overlapping of avatars is acceptable in the close collaboration mode.

The method 800 begins, in block 802, with the device determining a sightline perspective of a first user of the device relative to an object. For example, in the exemplary user interface shown in FIG. 6A, the first user is a student wanting to learn julienning the carrot 626. The device determines the sightline perspective of the student in front of the counter 620.

The method 800 continues, in block 804, with the device obtaining a sightline perspective of a second user and a body pose of the second user relative to the object. For example, in FIG. 6A, the second user is a teacher wanting to teach the student how to julienne the carrot 626. The device obtains the sightline perspective of the teacher as well as the teacher's body pose, as represented by the hands 630 on device 104-X.

The method 800 continues, in block 806, with the device rendering for display of the body pose of the second user into the sightline perspective of the first user. In some implementations, as represented by block 808, rendering for display of the body pose of the second user into the sightline perspective of the first user includes a transformation between a display to the first user and a display to the second user. In some implementations, the transformation includes aligning the viewpoints of the first user and the second user. For example, when a cooking tutorial demonstrates how to julienne carrots as shown in FIG. 6A, both the student and the teacher align their viewpoints towards the counter 620.

In some implementations, as represented by block 810, rendering for display of the body pose of the second user into the sightline perspective of the first user includes replacing the content associated with the second user with the content associated the first user. For example, in FIG. 6B, once the hands 610 and 630 are aligned, the hands 610 and/or 630 can be replaced by composited hands so that they move together.

In some implementations, as represented by block 812, rendering for display of the body pose of the second user into the sightline perspective of the first user includes presenting at least a portion of an avatar of a second user superimposed onto the object based on the sightline perspective of the first user. For example, as shown in FIGS. 6B-6D, the left hand 630-L1 is superimposed onto the left hand 610-L.

In some implementations, as represented by block 814, the method 800 further includes mapping the sightline perspective of the first user with the sightline perspective of the second user; detecting an update to a portion of the sightline perspective of the second user; identifying a corresponding portion of the sightline perspective of the first user according to the mapping; and updating the corresponding portion of the sightline perspective of the first user. For example, as shown in FIGS. 6C and 6D, the device maps the student's perspective with the teacher's perspective. Further, upon detecting a movement of the teacher's right hand 630-R towards the knife, the corresponding student's right hand 610-R is identified and moved to match the movement of the teacher's right hand 630-R1.

In some implementations, as represented by block 816, the method 800 further includes switching the sightline perspective of the first user to a third sightline perspective when the object is at least partially blocked by content in the sightline perspective of the first user. For example, while a contractor is demonstrating how to replace a faucet, but a gasket cannot be seen, e.g., being blocked by the hand of the contractor, the sightline perspective of the first user is switched to a third sightline perspective (e.g., a zoomed in view) for better viewing of the gasket.

Figure 9:
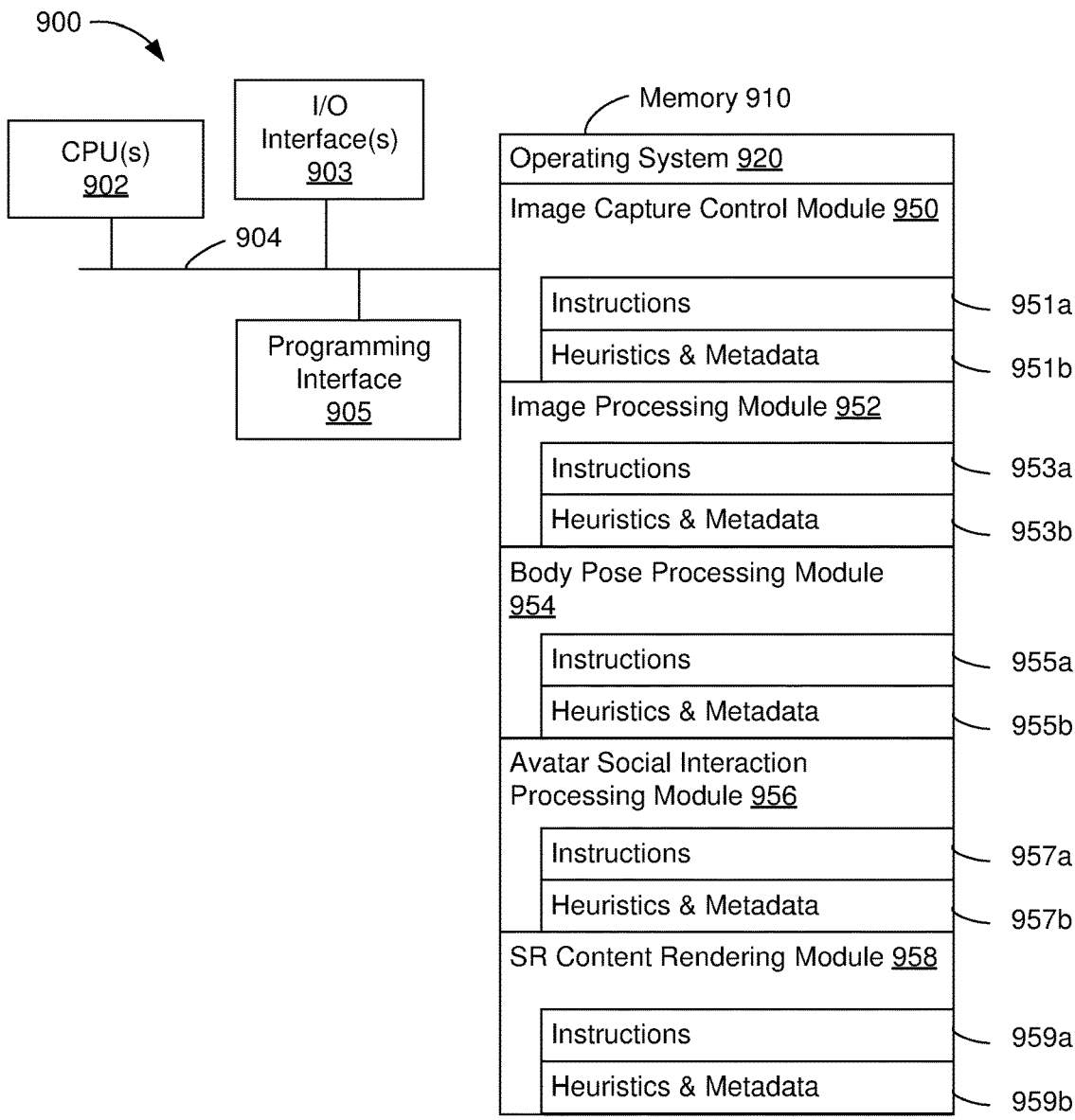
FIG. 9 is a block diagram of a computing device in accordance with some implementations.

FIG. 9 is a block diagram of a computing device 900 in accordance with some implementations. In some implementations, the computing device 900 corresponds to at least a portion of the device 104 in FIG. 1 and performs one or more of the functionalities described above. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the computing device 900 includes one or more processing units (CPUs) 902 (e.g., processors), one or more input/output (I/O) interfaces 903 (e.g., network interfaces, input devices, output devices, and/or sensor interfaces), a memory 910, a programming interface 905, and one or more communication buses 904 for interconnecting these and various other components.

In some implementations, the one or more communication buses 904 include circuitry that interconnects and controls communications between system components. The memory 910 includes high-speed random-access memory, such as DRAM, SRAM, DDR RAM or other random-access solid-state memory devices; and, in some implementations, include non-volatile memory, such as one or more magnetic disk storage devices, optical disk storage devices, flash memory devices, or other non-volatile solid-state storage devices. The memory 910 optionally includes one or more storage devices remotely located from the one or more CPUs 902. The memory 910 comprises a non-transitory computer readable storage medium. Moreover, in some implementations, the memory 910 or the non-transitory computer readable storage medium of the memory 910 stores the following programs, modules and data structures, or a subset thereof including an optional operating system 920, an image capture control module 950, an image processing module 952, a body pose processing module 954, an Avatar social interaction processing module 956, and an SR content rendering module 958. In some implementations, one or more instructions are included in a combination of logic and non-transitory memory. The operating system 920 includes procedures for handling various basic system services and for performing hardware dependent tasks.

In some implementations, the image capture control module 950 is configured to control the functionality of an image sensor or camera assembly to capture images or obtain image data. To that end, the image capture control module 950 includes a set of instructions 951a and heuristics and metadata 951b.

In some implementations, the image processing module 952 is configured to pre-process raw image data from the image sensor or camera assembly (e.g., convert RAW image data to RGB or YCbCr image data and derive pose information etc.). To that end, the image processing module 952 includes a set of instructions 953a and heuristics and metadata 953b.

In some implementations, the body pose processing module 954 is configured to process body pose of the user (e.g., processing IMU data). To that end, the body pose processing module 954 includes a set of instructions 955a and heuristics and metadata 955b.

In some implementations, the avatar social interaction processing module 956 is configured to process avatar social interactions. To that end, the avatar social interaction processing module 956 includes a set of instructions 957a and heuristics and metadata 957b.

In some implementations, the SR content rendering module 958 is configured to composite and render the SR content items in the field of view proximate to the recognized subject. To that end, the SR content rendering module 958 includes a set of instructions 959a and heuristics and metadata 959b.

Although the image capture control module 950, the image processing module 952, the body pose processing module 954, the avatar social interaction processing module 956, and the SR content rendering module 958 are illustrated as residing on a single computing device, it should be understood that in other implementations, any combination of the image capture control module 950, the image processing module 952, the body pose processing module 954, the Avatar social interaction processing module 956, and the SR content rendering module 958 can reside in separate computing devices in various implementations. For example, in some implementations each of the image capture control module 950, the image processing module 952, the body pose processing module 954, the Avatar social interaction processing module 956, and the SR content rendering module 958 can reside on a separate computing device or in the cloud.

Moreover, FIG. 9 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 9 could be implemented in a single module and the various functions of single functional blocks could be implemented by one or more functional blocks in various implementations. The actual number of modules and the division of particular functions and how features are allocated among them will vary from one embodiment to another, and may depend in part on the particular combination of hardware, software and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises"

and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a device having one or more processors, non-transitory memory, and one or more displays:
displaying simulated reality (SR) content to a first user using the one or more displays, the SR content comprising an avatar associated with a second user;
obtaining a trust level of the second user for the first user;
determining whether behavior of the avatar associated with the second user breaches a first set of avatar social interaction criteria corresponding to the trust level; and
attenuating at least a portion of the SR content representing the behavior of the avatar associated with the second user to a first degree in accordance with a determination that the behavior of the avatar associated with the second user breaches the first set of avatar social interaction criteria, wherein the first degree is different from a second degree of attenuating at least the portion of the SR content representing the behavior that is displayed to the second user.

2. The method of claim 1, wherein the behavior of the avatar associated with the second user does not breach a second set of avatar social interaction criteria corresponding to a second trust level of the first user for the second user.

3. The method of claim 1, wherein attenuating at least the portion of the SR content representing the behavior of the avatar associated with the second user in accordance with the determination that the behavior of the avatar associated with the second user breaches the first set of avatar social interaction criteria includes:
instructing a second device to display the SR content to a third user without attenuating at least the portion of the SR content representing the behavior of the avatar associated with the second user.

4. The method of claim 1, further comprising:
determining the first set of avatar social interaction criteria based at least in part on trust metrics for the first user, wherein the trust metrics include context of avatar social interactions, the trust level of the second user for the first user corresponding to the context, the first set of avatar social interaction criteria, and a degree of attenuation in case of breaching the first set of avatar social interaction criteria.

5. The method of claim 1, wherein attenuating at least the portion of the SR content representing the behavior of the avatar associated with the second user includes one or more of reducing playback of audio from the second user, and fading the behavior on the one or more displays.

6. The method of claim 1, further comprising:
receiving an input from the first user;
determining whether the input is a predetermined gesture; and
relocating to a location in the SR content where the avatar associated with the second user is not present in accordance with determining that the received input is the predetermined gesture.

7. The method of claim 1, further comprising:
aligning with the behavior of the avatar in accordance with the determination that the behavior of the avatar associated with the second user does not breach the first set of avatar social interaction criteria.

8. The method of claim 1, wherein the device includes at least one of a head-mounted device, a mobile phone, a tablet, a webcam, or a kiosk.

9. A device comprising:
one or more displays;
non-transitory memory; and
one or more processors configured to:
display simulated reality (SR) content to a first user using the one or more displays, the SR content comprising an avatar associated with a second user;
obtain a trust level of the second user for the first user;
determine whether behavior of the avatar associated with the second user breaches a first set of avatar social interaction criteria corresponding to the trust level; and
attenuate at least a portion of the SR content representing the behavior of the avatar associated with the second user to a first degree in accordance with a determination that the behavior of the avatar associated with the second user breaches the first set of avatar social interaction criteria, wherein the first degree is different from a second degree of attenuating at least the portion of the SR content representing the behavior that is displayed to the second user.

10. The device of claim 9, wherein the behavior of the avatar associated with the second user does not breach a second set of avatar social interaction criteria corresponding to a second trust level of the first user for the second user.

11. The device of claim 9, wherein attenuating at least the portion of the SR content representing the behavior of the avatar associated with the second user in accordance with the determination that the behavior of the avatar associated with the second user breaches the first set of avatar social interaction criteria includes:
instructing a second device to display the SR content to a third user without attenuating at least the portion of the SR content representing the behavior of the avatar associated with the second user.

12. The device of claim 9, wherein the one or more processors are further configured to:
determine the first set of avatar social interaction criteria based at least in part on trust metrics for the first user, wherein the trust metrics include context of avatar social interactions, the trust level of the second user for the first user corresponding to the context, the first set of avatar social interaction criteria, and a degree of attenuation in case of breaching the first set of avatar social interaction criteria.

13. The device of claim 9, wherein attenuating at least the portion of the SR content representing the behavior of the avatar associated with the second user includes one or more of reducing playback of audio from the second user, and fading the behavior on the one or more displays.

14. The device of claim 9, wherein the one or more processors are further configured to:
- receive an input from the first user;
- determine whether the input is a predetermined gesture; and
- relocate to a location in the SR content where the avatar associated with the second user is not present in accordance with determining that the received input is the predetermined gesture.

15. The device of claim 9, wherein the one or more processors are further configured to:
- align with the behavior of the avatar in accordance with the determination that the behavior of the avatar associated with the second user does not breach the first set of avatar social interaction criteria.

16. A non-transitory memory storing one or more programs, which, when executed by one or more processors of a device with an interface for communicating with one or more displays, cause the device to:
- display simulated reality (SR) content to a first user using the one or more displays, the SR content comprising an avatar associated with a second user;
- obtain a trust level of the second user for the first user;
- determine whether behavior of the avatar associated with the second user breaches a first set of avatar social interaction criteria corresponding to the trust level; and
- attenuate at least a portion of the SR content representing the behavior of the avatar associated with the second user to a first degree in accordance with a determination that the behavior of the avatar associated with the second user breaches the first set of avatar social interaction criteria, wherein the first degree is different from a second degree of attenuating at least the portion of the SR content representing the behavior that is displayed to the second user.

17. The non-transitory memory of claim 16, wherein the behavior of the avatar associated with the second user does not breach a second set of avatar social interaction criteria corresponding to a second trust level of the first user for the second user.

18. The non-transitory memory of claim 16, wherein attenuating at least the portion of the SR content representing the behavior of the avatar associated with the second user in accordance with the determination that the behavior of the avatar associated with the second user breaches the first set of avatar social interaction criteria corresponding to the trust level includes:
- instructing a second device to display the SR content to a third user without attenuating at least the portion of the SR content representing the behavior of the avatar associated with the second user.

19. The non-transitory memory of claim 16, wherein one or more programs, which, when executed, further cause the device to:
- determine the first set of avatar social interaction criteria based at least in part on trust metrics for the first user, wherein the trust metrics include context of avatar social interactions, the trust level of the second user for the first user corresponding to the context, the first set of avatar social interaction criteria, and a degree of attenuation in case of breaching the first set of avatar social interaction criteria.

20. The non-transitory memory of claim 16, wherein one or more programs, which, when executed, further cause the device to:
- receive an input from the first user;
- determine whether the input is a predetermined gesture; and
- relocate to a location in the SR content where the avatar associated with the second user is not present in accordance with determining that the received input is the predetermined gesture.

21. The non-transitory memory of claim 16, wherein one or more programs, which, when executed, further cause the device to:
- align with the behavior of the avatar in accordance with the determination that the behavior of the avatar associated with the second user does not breach the first set of avatar social interaction criteria.

22. The non-transitory memory of claim 16, wherein attenuating at least the portion of the SR content representing the behavior of the avatar associated with the second user includes one or more of reducing playback of audio from the second user, and fading the behavior on the one or more displays.

* * * * *